United States Patent [19]
Awazu

[11] Patent Number: 5,987,009
[45] Date of Patent: Nov. 16, 1999

[54] MULTIPOINT/MULTICHANNEL CONNECTION DEVICE IN INTEGRATED SERVICES DIGITAL NETWORK

[75] Inventor: Tomohiko Awazu, Kanagawa, Japan

[73] Assignee: Fujitsu Limited, Kanagawa, Japan

[21] Appl. No.: 08/741,216

[22] Filed: Oct. 29, 1996

[30] Foreign Application Priority Data

Dec. 19, 1995 [JP] Japan ................................... 7-330871

[51] Int. Cl.⁶ .................................................. H04M 3/42
[52] U.S. Cl. ......................... 370/260; 370/420; 370/524; 348/16; 379/93.07; 379/246
[58] Field of Search .................... 370/260, 261, 370/264, 420, 522, 524; 348/15, 16, 13, 14; 379/93.01, 93.07, 93.14, 93.21, 201, 202, 242, 245, 246

[56] References Cited

U.S. PATENT DOCUMENTS

| | | | |
|---|---|---|---|
| 5,555,017 | 9/1996 | Landante et al. | 348/15 |
| 5,563,882 | 10/1996 | Bruno et al. | 370/260 |
| 5,600,646 | 2/1997 | Polomski | 370/263 |
| 5,625,407 | 4/1997 | Biggs et al. | 348/16 |
| 5,757,781 | 5/1998 | Gilman et al. | 370/260 |

OTHER PUBLICATIONS

Helgert, H., Integrated Services Digital Networks, P. 396–399, 1991.

*Primary Examiner*—Alpus H. Hsu
*Attorney, Agent, or Firm*—Helfgott & Karas, PC.

[57] ABSTRACT

A multipoint multichannel connection device for line-connecting communication terminals at multiple points and a central unit through an integrated services digital network which has a function of communicating the number of a source communications terminal as source number information includes a source number information identifying section incorporated in a central unit, which identifies source number information from the integrated services digital network unit process arriving channels for which source number information is recognized as being identical, as arriving channels from the same communications terminal. As a result, the central unit identifies arriving channels from a plurality of communications terminals individually and then processes them without communicating source number information with the communications terminals.

9 Claims, 28 Drawing Sheets

| COMMUNICATIONS PROCESSING SECTION NUMBER | USE CONDITION | COMMUNICATIONS TERMINAL INFORMATION (SOURCE NUMBER INFORMATION) | COMMUNICATIONS CHANNEL NUMBER ON LINE (n PIECES) |
|---|---|---|---|
| COMMUNICATIONS PROCESSING SECTION 1 | BUSY | {SOURCE NUMBER(A)} | $Z_{11},\ldots,Z_{1n}$ |
| COMMUNICATIONS PROCESSING SECTION 2 | BUSY | {SOURCE NUMBER(B)} | $Z_{21},\ldots,Z_{2n}$ |
| COMMUNICATIONS PROCESSING SECTION x | BUSY | {SOURCE NUMBER(X)} | $Z_{x1},\ldots,Z_{xn}$ |

FIG. 4

[REQUEST-TO-SEND]

| MESSAGE TYPE (REQUEST-TO-SEND) | CALL NUMBER | ARRIVAL NUMBER INFORMATION (NUMBER OF TERMINAL TO WHICH ARRIVING MESSAGE IS CONNECTED) |
|---|---|---|

[ARRIVING INFORMATION]

| MESSAGE TYPE (ARRIVING INFORMATION) | CALL NUMBER | SOURCE TERMINAL NUMBER INFORMATION (SOURCE NUMBER) | ARRIVAL NUMBER INFORMATION (ARRIVAL NUMBER) |
|---|---|---|---|

[CONNECTION RESPONSE]

| MESSAGE TYPE (CONNECTION RESPONSE) | CALL NUMBER |
|---|---|

[RECEPTION REJECT RESPONSE]

| MESSAGE TYPE (DISCONNECT) | CALL NUMBER | REASON (RECEIVING USER IS BUSY) |
|---|---|---|

[REQUEST TO TRANSFER ARRIVING MESSAGE]

| MESSAGE TYPE (REQUEST TO TRANSFER ARRIVING MESSAGE) | CALL NUMBER | ARRIVAL NUMBER INFORMATION (NUMBER OF TERMINAL TO WHICH ARRIVING MESSAGE IS TRANSFERRED) |
|---|---|---|

[ARRIVING CHANNEL TRANSFER INFORMATION]

| MESSAGE TYPE (ARRIVING CHANNEL TRANSFER INFORMATION) | CALL NUMBER | SOURCE TERMINAL NUMBER INFORMATION (SOURCE NUMBER) | ARRIVAL NUMBER INFORMATION (ARRIVAL NUMBER) |
|---|---|---|---|

F I G. 6

| COMMUNICATIONS PROCESSING SECTION NUMBER | USE CONDITION | COMMUNICATIONS TERMINAL INFORMATION (SOURCE NUMBER INFORMATION) | COMMUNICATIONS TERMINAL INFORMATION (ARRIVAL NUMBER INFORMATION) | COMMUNICATIONS CHANNEL NUMBER ON LINE (n PIECES) |
|---|---|---|---|---|
| COMMUNICATION PROCESSING SECTION 1 | BUSY | {SOURCE NUMBER(A)} | — | $Z_{11}, \ldots, Z_{1n}$ |
| COMMUNICATION PROCESSING SECTION 2 | BUSY | {SOURCE NUMBER(B)} | — | $Z_{21}, \ldots, Z_{2n}$ |
| COMMUNICATION PROCESSING SECTION y | BUSY | NONE | {ARRIVAL NUMBER(Ma)} | $Z_{y1}, \ldots, Z_{yn}$ |
| COMMUNICATION PROCESSING SECTION x | BUSY | NONE | {ARRIVAL NUMBER(Mx)} | $Z_{x1}, \ldots, Z_{xn}$ |

FIG. 9

| COMMUNICATIONS PROCESSING SECTION NUMBER | USE CONDITION | COMMUNICATIONS TERMINAL INFORMATION (SOURCE NUMBER INFORMATION) | COMMUNICATIONS TERMINAL INFORMATION (ARRIVAL NUMBER INFORMATION) | COMMUNICATIONS CHANNEL NUMBER ON LINE (n PIECES) |
|---|---|---|---|---|
| COMMUNICATION PROCESSING SECTION 1 | BUSY | {SOURCE NUMBER(A)} | — | $Z_{11}, \ldots, Z_{1n}$ |
| COMMUNICATION PROCESSING SECTION 2 | BUSY | {SOURCE NUMBER(B)} | — | $Z_{21}, \ldots, Z_{2n}$ |
| COMMUNICATION PROCESSING SECTION x | BUSY | NONE | NONE | $Z_{x1}, \ldots, Z_{xn}$ |

FIG. 12

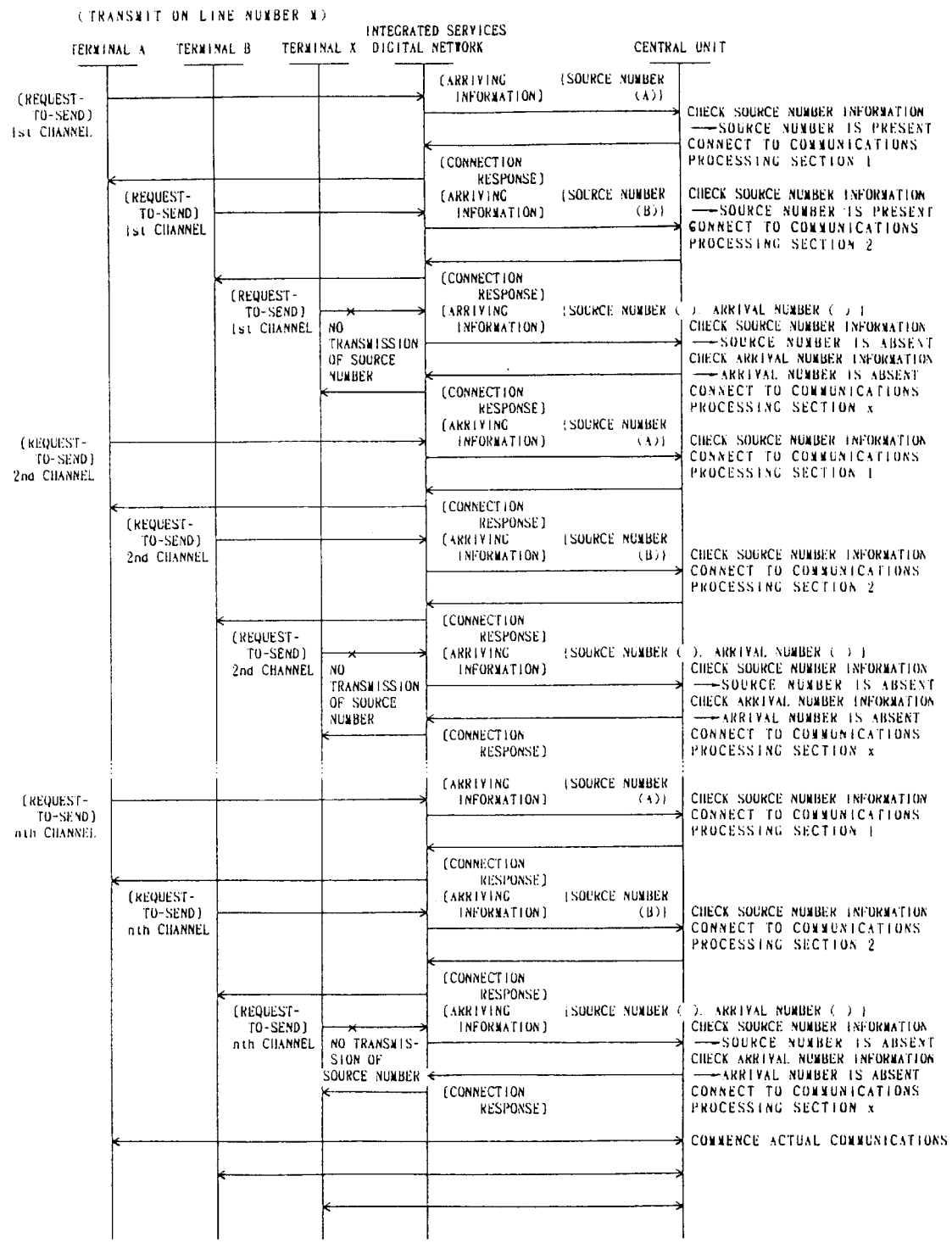
F I G. 14

| COMMUNICATIONS PROCESSING SECTION NUMBER | USE CONDITION | COMMUNICATIONS TERMINAL INFORMATION (SOURCE NUMBER INFORMATION) | LINE NUMBER, COMMUNICATIONS CHANNEL NUMBER ON LINE (n PIECES) |
|---|---|---|---|
| COMMUNICATIONS PROCESSING SECTION 1 | BUSY | {SOURCE NUMBER(A)} | $(M1, Z_{11})$ ......, $(MX, Z_{1n})$ |
| COMMUNICATIONS PROCESSING SECTION 2 | BUSY | {SOURCE NUMBER(B)} | $(M1, Z_{21})$ ......, $(MX, Z_{2n})$ |
| ⋮ | ⋮ | ⋮ | ⋮ |
| COMMUNICATIONS PROCESSING SECTION x | BUSY | {SOURCE NUMBER(X)} | $(M1, Z_{x1})$ ......, $(MX, Z_{xn})$ |

FIG. 17

MULTIPOINT/MULTICHANNEL CONNECTION DEVICE IN INTEGRATED SERVICES DIGITAL NETWORK

BACKGROUND OF THE INVENTION

1. Field of the Invention

The invention relates to a technique for identifying and processing arriving channels from multiple points individually in an integrated services digital network.

2. Description of the Related Art

With the recent spread of integrated services digital networks (ISDNs), center services, such as multipoint television conferencing, multipoint voice graphic conferencing, and the like, are being implemented.

In order to implement these various services, the communications capacity is required to be several times the capacity of the basic channel (B channel) of the current integrated services digital networks. For these services, therefore, a plurality of basic channels on a line are used simultaneously.

When the connection is set up between communications terminals that provide various services and a multipoint central unit, the central unit is required to identify arriving channels from a plurality of points individually in an efficient manner for subsequent processing.

As a first prior art to implement such a function, there is a technique in which, when each terminal makes a request for connection to the central unit, it informs the central unit of its terminal number using the B channel after the connection has been established by the central unit.

With this prior art, however, actual communications commence after each communications terminal (terminal number) has been identified using control communications data on the B channel. The problem with the first prior art is therefore that it takes long time to the commencement of communications. In addition, each terminal is required to have a function of sending its own terminal number as control communications data over the B channel and the central unit is also required to have a function of receiving and identifying control communications data on each B channel. This makes the system configuration complex.

As a second prior art, a central unit is provided with lines, the number of which corresponds to the maximum number of communications terminals. Each terminal is allocated an individual line number and makes transmissions using the line allocated to it. The central unit recognizes a plurality of arriving channels originating on each line as incoming channels from the communications terminal corresponding to that line.

The problem with the second prior art is that the central unit has to be provided with lines, the number of which corresponds to the maximum number of communications terminals.

SUMMARY OF THE INVENTION

It is therefore an object of the present invention to provide a multipoint/multichannel connection device which is implemented by simple connection processing and is simple in system configuration.

A first mode of the present invention supposes the use of an integrated services digital network which has a function of communicating the number of a source communications terminal as source number information.

A source number information identifying section in a central unit identifies source number information from the integrated services digital network.

Communications processing sections in the central unit process arriving channels for which source number information is recognized as being identical as arriving channels from the same communications terminal.

As a result, the central unit identifies arriving channels from a plurality of communications terminals individually and then processes them without communicating source number information with the communications terminals.

BRIEF DESCRIPTION OF THE DRAWINGS

Other objects and advantages of the present invention will be apparent from the following description of the preferred embodiments of the invention in conjunction with the accompanying drawings in which:

FIG. 4 shows the connection information table in the first embodiment;

FIG. 6 shows examples of formats for call control communications between the integrated services digital network and the center unit;

FIG. 9 shows an arrangement of the connection information table in the second embodiment;

FIG. 12 shows an arrangement of the connection information table in the third embodiment;

FIG. 14 shows the processing sequence in the third embodiment;

FIG. 17 shows an arrangement of the connection information table in the fourth embodiment;

DESCRIPTION OF THE PREFERRED EMBODIMENTS

Description of the Principles

Before describing the preferred embodiments of the invention, the principles of the present invention will be described.

Figure 1:
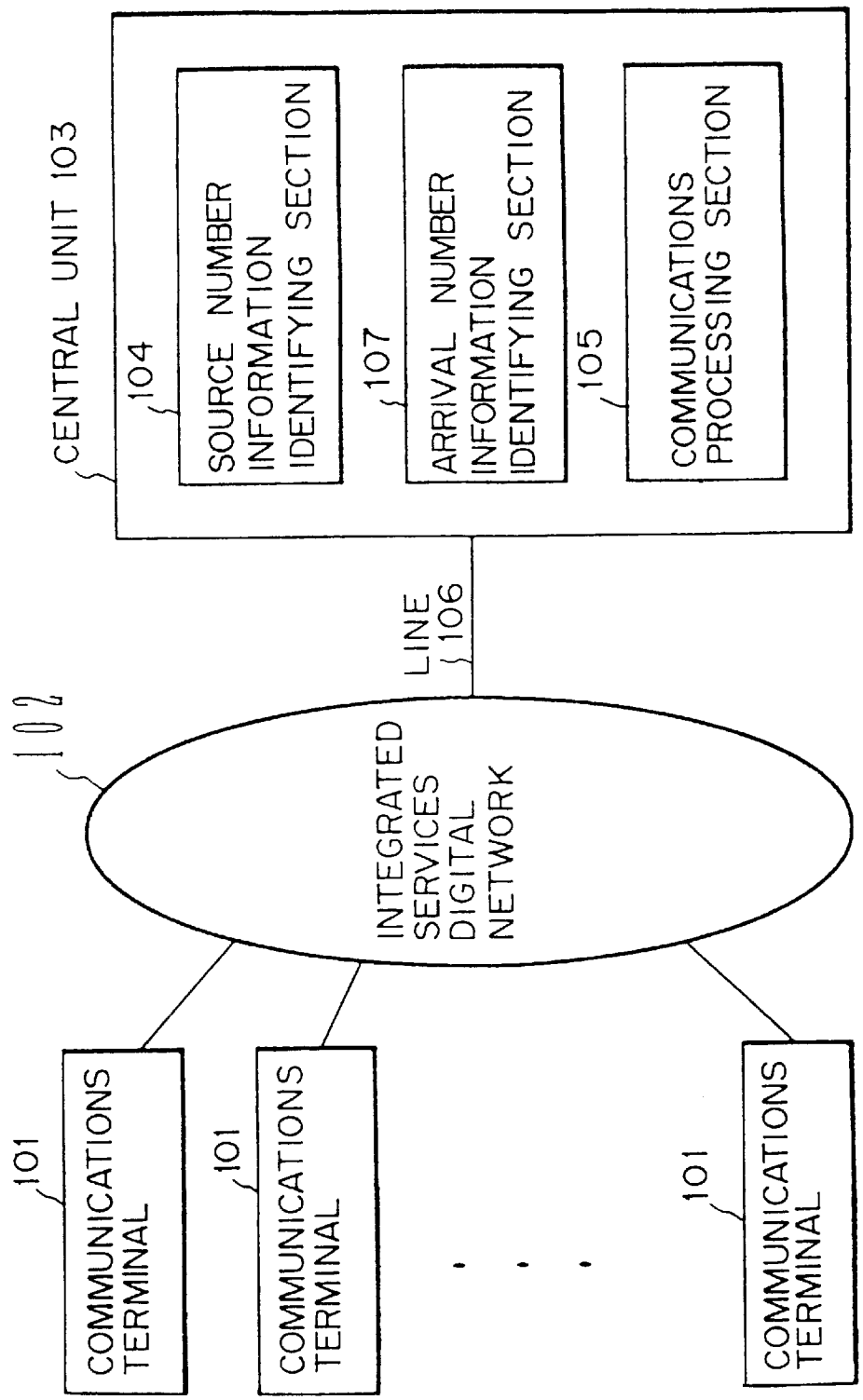
FIG. 1 is the first block diagram of the present invention.

In the first place, a first mode of the invention will be described with reference to FIG. 1.

The first mode of the present invention supposes a multipoint/multichannel connection device which makes line connections between communications terminals 101 at multiple points and a central unit 103 through a plurality of channels by using an integrated services digital network 102 having a function of informing the central unit of the number of a source communications terminal 101 as source number information.

First, a source number information identifying section 104 in the central unit 103 identifies the source number information sent from the integrated services digital network 102.

Next, a communications processing section 105 in the central unit 103 processes arriving channels having identical number information as arriving channels from the same communications terminal 101.

According to the configuration in the first mode of the present invention described above, the central unit 103 is able to efficiently identify arriving channels from the communications terminals 101 individually for subsequent processing without communications of source number information between the communications terminals 101 and the central unit 103.

Next, a second mode of the present invention will be described with reference to FIG. 1.

In the second mode, the integrated services digital network 102 has a function of maintaining or registering a plurality of separate numbers in addition to a main number for a single line 106 connected to the central unit 103 and informing the central unit of a separate number for a line 106 that is specified by a communications terminal 101 at the time of transmission as arrival number information.

First, a communications terminal 101 transmits to the central unit 103 using one of the preallocated separate numbers.

An arrival number information identifying section 107 in the central unit 103 identifies the arrival number information sent by the integrated services digital network 102.

The communications processing section 105 in the central unit 103 processes arriving channels for which the arrival number information is recognized as being identical as arriving channels from the same communications terminal 101.

According to the configuration of the second mode of the present invention, even if no transmission of source number information to the central unit 103 is made because of constraints on the integrated services digital network 102, arriving channels from the communications terminals 101 can be efficiently identified terminal by terminal for subsequent processing by allowing each communications terminal to selectively send arrival number information.

Next, a third mode of the present invention will be described with reference to FIG. 1.

The third mode has a function implemented by using the configurations of the first and second modes in combination. The communications processing section 105 processes arriving channels, the number of which is a predetermined number or less for which neither source number information nor arrival number information is identified, as arriving channels from the same communications terminal 101.

According to the configuration of the third mode, even if source number information is not transmitted to the central unit 103 because of constraints on the integrated services digital network 102 and a source communications terminal 101 does not specify arrival number information, arriving channels from that communications terminal 101 can be identified, then processed.

Figure 2:
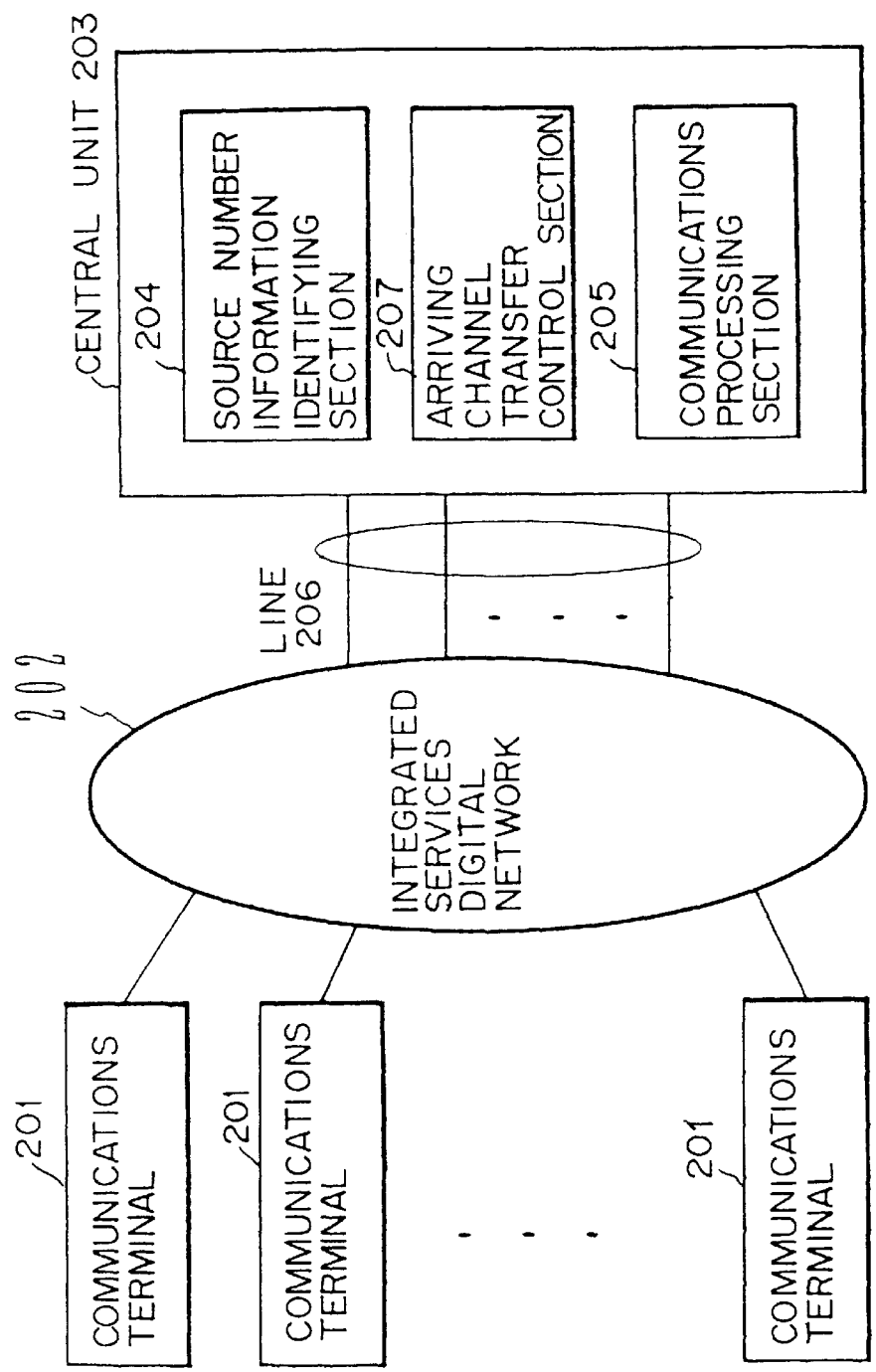
FIG. 2 is the second block diagram of the present invention.

Next, a fourth mode of the present invention will be described with reference to FIG. 2.

The fourth mode supposes a multipoint/multichannel connection device that uses an integrated services digital network 202 having a function of presenting the number of a source communication terminal 201 as source number information and makes a line connection between communications terminals 201 at multiple points and a central unit 203 using a plurality of channels.

The central unit 203 and the integrated services digital network 202 are connected together by a set of lines 206 and a key number is set up on the set of lines 206.

A source number information identifying section 204 in the central unit 203 identifies source number information sent over any of the lines 206 connected to the integrated services digital network 202.

A communications processing section 205 in the central unit 203 processes any arriving channels on any line 206 for which source number information is recognized as being identical, as arriving channels from the same communications terminal 201.

According to the configuration of the fourth mode of the present invention as described above, the use of the key number function with the integrated services digital network 202 permits free channels on a free line 206 to be used to efficiently identify arriving channels from the communications terminals 201 individually without providing the central unit 203 with a plurality of lines, the number of which corresponds to the maximum number of the communications terminals 201.

Next, a fifth mode of the present invention will be described with reference to FIG. 2.

The fifth mode of the present invention does not necessarily require the source number information identifying section 204.

First, the central unit 203 and the integrated services digital network 202 are connected together by a plurality of lines 206 and each of the lines is allocated an individual line number.

Next, each of the communications terminals 201 makes transmission to the central unit 203 using a preallocated line 206 and, if a transmission is rejected, makes transmission to the central unit 203 using another line 206.

Finally, the communications processing section 205 in the central unit 203 processes arriving channels on a line 206 as incoming channels from the same communications terminals 201.

According to the configuration of the fifth mode of the present invention as described above, free lines 206 can be used to efficiently identify arriving channels from the communications terminals 201 by terminal without providing the central unit with a plurality of lines, the number of which corresponds to the maximum number of the terminals 201.

Next, a sixth mode of the invention will be described with reference to FIG. 2.

In the sixth mode of the invention, the integrated services digital network 202 has a function of transferring arriving channels.

First, the central unit 203 and the integrated services digital network 202 are connected together by a plurality of lines 206 and each of the lines is allocated an individual line number.

Next, each of the communications terminals 201 makes transmission to the central unit 203 using a preallocated line number 206.

The communications processing section 205 in the central unit 203 processes arriving channels on a same line 206 as arriving channels from the same communications terminal 201.

An arriving channel transfer control section 207 searches for a free line 206 for arriving channels for a line 206 that is processing or busy, and issues to the integrated services digital network 202 a request to transfer the arriving channels to the free line 206 searched for. On the basis of arriving channel transfer information provided by the integrated services digital network 202 in response to that request, the transfer control section 207 allows the arriving channels to enter the central unit 203 over the free line 206.

According to the configuration of the sixth mode described above, free lines 206 can be used to efficiently identify arriving channels from the communications terminals 201 by terminal without providing the central unit with a plurality of lines, the number of which corresponds to the maximum number of the terminals 201. In this case, even if each communications terminal does not have a function of, when a transmission is rejected, making a transmission to the central unit 203 through the use of another line number, that transmission can be transferred quickly to another line and then arrive at the central unit.

Next, a seventh mode of the invention will be described with reference to FIG. 2.

The seventh mode is based on the configuration of the sixth mode.

If, when the transfer control section 207 is performing a process of transferring an arriving channel to a free line 206, a second arriving channel originates on that free line 206, the control section searches for a second free line 206 and issues to the integrated services digital network 202 a request to transfer the second arriving channel to the second free line 206. On the basis of second transfer information provided by the integrated services digital network in response to that request, the transfer control section 207 transfers the second arriving channel to the second free line 206.

According to the configuration of the seventh mode of the present invention as described above, the originating of an arriving channel from another communications terminal 201 on a line 206 to which an arriving channel is being transferred is detected, and the arriving channel from another communications terminal is transferred to a separate free line 206, thereby permitting highly reliable communications to be achieved.

In the configuration of the fifth through seventh modes of the present invention as described above, the central unit 203 may be configured to further include a transmission control section that searches for a free line, makes transmission to a specific communications terminal using that free line, and processes a plurality of channels on the free line 206 as transmissions to the specific communications terminal 201 the communications processing section 205.

Thereby, efficient connection of a plurality of channels can be made from the central unit 203 to specific communications terminals 201.

DESCRIPTION OF THE PREFERRED EMBODIMENTS

Next, the preferred embodiments of the present invention will be described in detail with reference to the figures.

First Preferred Embodiment

Figure 3:
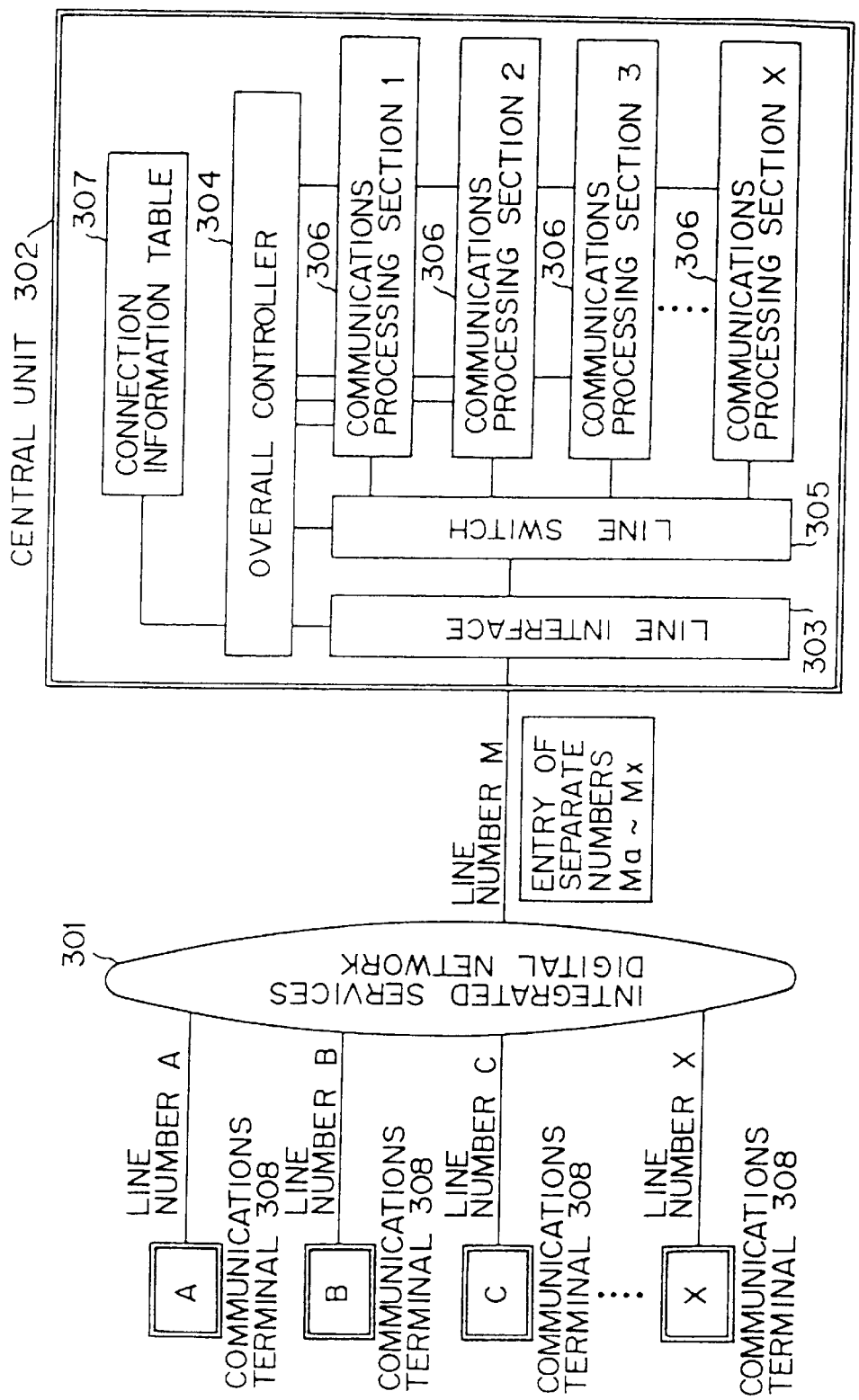
FIG. 3 shows an arrangement of a multipoint center system in the first to the third embodiments of the present invention.

FIG. 3 is a block diagram of a multipoint central system according to a first preferred embodiment of the present invention.

In the system shown in FIG. 3, communications terminals 308 (A to X) are line-connected to a multipoint central unit 302 (hereinafter also referred to simply as a central unit) via an integrated services digital network 301, thereby providing services such as multipoint television conferencing and the like.

As a method of line connection, each communications terminal 308 first makes a transmission over a single line (line number M) of the central unit 302 for connection to the central unit. A plurality of basic channels of the digital network is then used between the communications terminals 308 and the central unit 302 to implement the actual communications of video, sound, data, etc.

The number of basic channels to be used is determined for each system.

Figure 5:
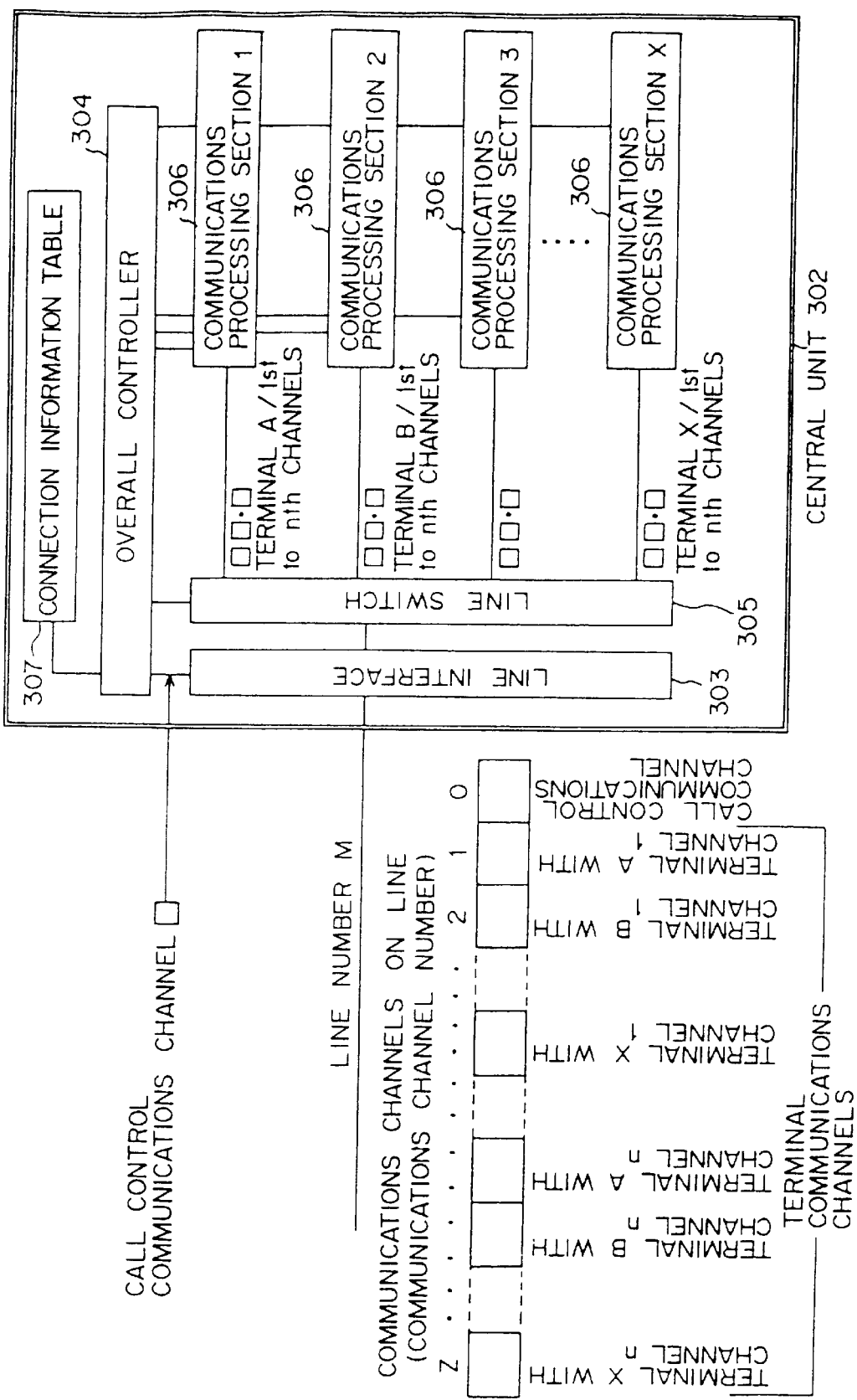
FIG. 5 shows communications channels on lines in the first to the third embodiments.

FIG. 5 shows an arrangement of communications channels on the line. The communications channels (basic channels of the integrated services digital network) are allocated communications channel numbers 0 to Z, respectively. Each communications channel is identified by its number.

The communications channel allocated the communications channel number 0 is a call control communications channel, which is used for line connection between the multipoint central unit 302 or the communications terminals 308 (A to X) and the integrated services digital network 301. All other communications channels are terminal communications channels, which are used for actual communications of video, sound, data, etc., between the communications terminals 308 and the multipoint central unit 302.

In FIG. 6, there is shown an example of a format for call control communications using the call control communications channel. Each message is identified by the contents of the initial code representing a type of message.

In FIG. 6, the code "request-to-send" represents a message that a source communications terminal 308 or central unit 302 sends to the integrated services digital network 301. To this message is attached information on the number of the destination with which the connection is to be set up (arrival number information).

The code "arriving information" represents a message that is presented to the receiving communications terminal 308 or central unit 302 by the integrated services digital network 301 when the source communication terminal 308 or central unit 302 makes a request to send. To this message is attached number information (source number information or source terminal number information) for identifying the source terminal, and number information (arrival number information) for specifying the arriving end in accordance with the contents of the services provided by the integrated services digital network.

The code "connection response" represents a message that the arriving communications terminal 308 or central unit 302 sends to the integrated services digital network 301 to respond to the line connection. The integrated services digital network 301 completes the line connection by receiving or relaying that message, so that the message is returned to the source communications terminal 308 or central unit 302.

The code "reception reject response" represents a message sent by the arriving communications terminal 308 or central unit 302 that has received the "arriving information" message to the integrated services digital network for the purpose of making a notification that the acceptance of the corresponding call is rejected because the line connected to that arriving terminal or central unit is busy or is about to be used. This message contains the message type code for disconnection and a reason code describing that the receiving user is busy.

The code "request to transfer arriving message" represents a message that is sent to the integrated services digital network 301 by the receiving communications terminal 308 or central unit 302 that has received the "arriving information" message so as to make a request to forward the call to a line interface 303. This message contains the number information (arrival number information) of a terminal to which the call is to be forwarded.

The code "arriving channel transfer information" represents a message that is presented by the integrated services digital network 301 to the receiving communications terminal 308 or central unit 302 to which the call is forwarded in response to the request to transfer the arriving message. To this message are attached number information (source number information) for identifying the source terminal and number information (arrival number information) for identifying the receiving terminal according to the contents of services provided by the integrated services digital network 301. Owing to the arriving message transfer message, the communications terminal 308 or central unit 302 to which arriving information is transferred can know that a message has been forwarded to it, thus distinguishing between the normal "arriving information" and the "arriving channel transfer information".

The above-described messages have call numbers attached, which, when a plurality of call control processes occur simultaneously or are overlapped, are used in order for the integrated services digital network 301 and the communications terminals 308 or central unit 302 to identify these processes.

Referring back to FIG. 3, the line interface 303 in the multipoint central unit 302 establishes a physical/electrical interface to the integrated services digital network 301 and terminates a call control communications channel and terminal communications channels each corresponding to a respective one of the communications terminals 308 shown in FIG. 5. The line interface 303 relays the call control communications channel to an overall controller 304 and the terminal communications channels to a line switching section 305 as shown in FIG. 5.

The line switching section 305 separates the communications channels on the line shown in FIG. 5 into individual channels corresponding to the communications terminals 308 (A to X) and relays each of the communications channels to a corresponding one of communications processing sections 306 (1 to x) each corresponding to a respective one of the communications terminals 308, as instructed by the overall controller 304. The communications channel positions on the line used by the respective communications terminals 308 (A to X) depend on the order of line connections and hence vary every time.

The communications processing sections 306 (1 to x), which correspond with the communications terminals 308 (A to X) connected thereto, perform reception of data channels for video, sound, data, etc., data processing for each of media of video, sound, and data, and retransmission of data channels for video, sound, data, etc.

The overall controller 304 transmits or receives the messages shown in FIG. 6 to or from the integrated services digital network 301 over the call control communications channel, thereby establishing line connections to the communications terminals 308. This is performed on the basis of software-based processing. In addition, at the time of line connection of any of the terminal communications channels, the overall controller 304 identifies connected communications terminals 308 (A to X) quickly and causes the line switching section 305 to discriminate among a plurality of basic channels from each of the communications terminals 308 (A to X) and correctly connect them to the corresponding communications processing section 306 (1 to X). Moreover, the overall Controller 304 controls the communications processing sections 306. Furthermore, the overall controller 304 uses the connection information table 307 shown in FIG. 4 to establish a correspondence among the following information:

1. Communications processing section number.
2. Communications terminal information presented as source terminal number information (source number information) in the "arriving information" message (refer to FIG. 6) on the arrival of the terminal communications channel from a communications terminal.
3. Terminal communications channels positions on the line (communications channel numbers).

The configuration of the first preferred embodiment as described above permits a communications terminal 308 (A to X) with which the connection is set up to be identified quickly at the time of line connection of terminal communications channels and actual communications over a plurality of basic channels to be started efficiently.

Figure 7:
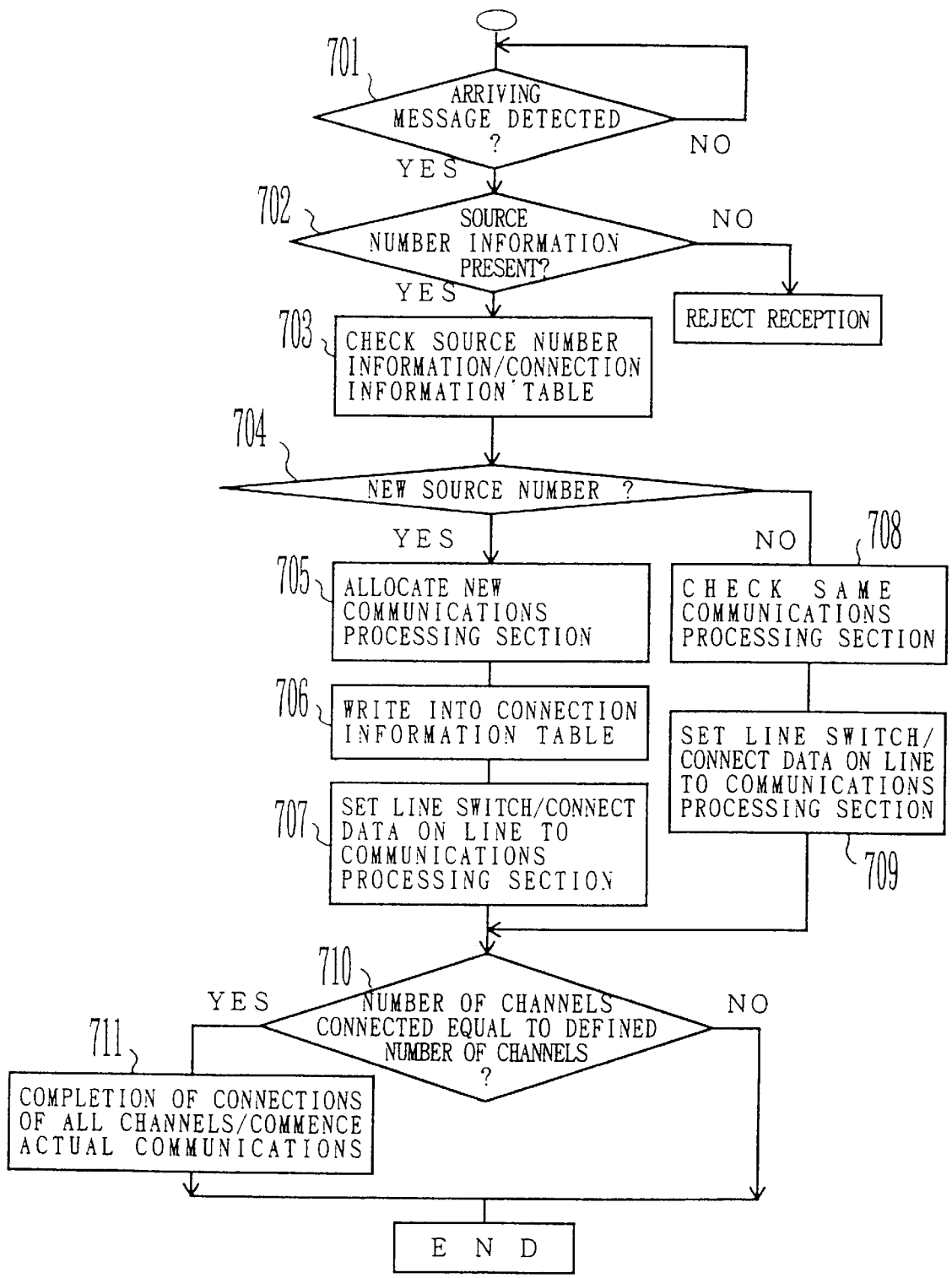
FIG. 7 is an operating flowchart showing the processing procedure of the overall controller in the first embodiment.
Figure 8:
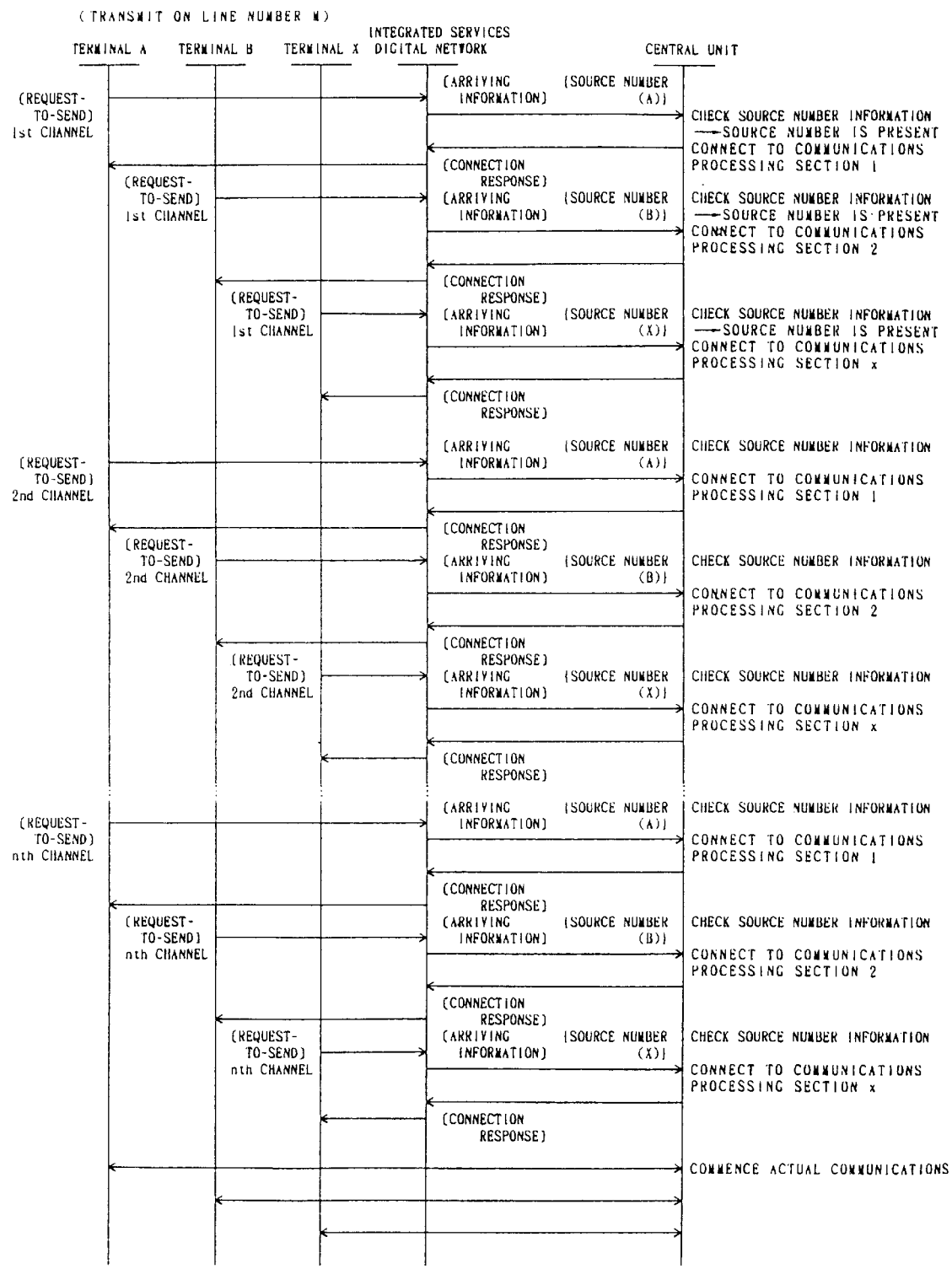
FIG. 8 shows the processing sequence in the first embodiment.

FIG. 7 shows the flow of control by the overall controller 304 in the first preferred embodiment and FIG. 8 shows the corresponding processing sequence in the first preferred embodiment.

In FIG. 8, each of the communications terminals 308 (A to X) of FIG. 3 makes a line connection to basic channels 1 to n of the integrated services digital network 301 in sequence. In the system shown in FIG. 3, the number, n, of the basic channels that are used by each communications terminal is fixed in advance.

In the central unit 302, on the arrival of each basic channel, the source terminal number information (source number information) contained in the "arriving information" message is sent to the overall controller 304. The overall controller 304 then carries out the procedure shown in FIG. 7 on the basis of the message received.

In the first place, the 1st channel from the communications terminal 308 (A) having the source number information (A) arrives and the overall controller 304 allocates the communications processing section 306 (1) to that channel (steps 701 to 705). Likewise, the 1st channel from the communications terminal 308 (B) having the source number information (B) arrives and the overall controller 304 allocates the communications processing section 306 (2) to that channel. After that, the same processing is performed. Finally, the 1st channel from the communications terminal 308 (X) having the source number information (X) arrives and the overall controller 304 allocates the communications processing section 306 (X) for that channel.

A relationship between the source number information and the allocated communications processing sections 306 is written into the connection information table 307 shown in FIG. 4 (step 706). Whenever an arriving channel arrives and the source number information is detected (YES in steps 701 and 702), the connection information table is checked to determine whether that number information has been entered into the table (step 703). If no source number information is detected, then the arriving channel is rejected.

If the source number information is not found in the connection information table 307 and is therefore considered to be new (YES in step 704), a new communications processing section 306 is allocated (step 705). If, on the other hand, the identical source number information has already been entered into the connection information table 307 (NO in step 704), then the same communications processing section 306 is allocated (step 708).

The overall controller 304 controls the line switch 305 each time allocation of the communications processing sections 306 is performed, so that the terminal communications channel in the channel position specified by the communications channel number is connected to the allocated communications processing section 306 (step 707 or 709).

In this manner, the 2nd to nth channels associated with each of the communications terminals 308 (A to X) are connected to a predetermined one of the communications processing sections 306 (1 to x) as shown in FIG. 8. When the connection of n channels is completed for each communications terminal 308 (YES in step 710), an actual communication of video, sound, data, or the like commences (step 711).

Second Preferred Embodiment

The system configuration of the second embodiment remains unchanged from that of the first embodiment shown in FIGS. 3, 5 and 6. The second embodiment is intended to accommodate communications terminals 308 which do not transmit source terminal number information.

With the current integrated services digital network 301, users can apply for separate numbers Ma to Mx besides the basic line number M for the lines on the side of the central unit 302.

When normal communications terminals 308 transmit messages on the basic line number M, the source number information is transmitted to the central unit 302 with the arrival of the messages.

For example, assume here that the source number information of each of communications terminals 308 (X, Y) is not transmitted to the central unit 302 with the arrival of messages, due to constraints on network paths. If the communications terminals 308 (X, Y) transmit on separate numbers (Ma to Mx), the separate numbers (Ma to Mx) are attached to the "arriving information" message shown in FIG. 6 as number information (arrival number information) for specifying terminals from which messages arrive.

In the second embodiment, the arrival number information is analyzed to identify each source terminal.

Figure 10:
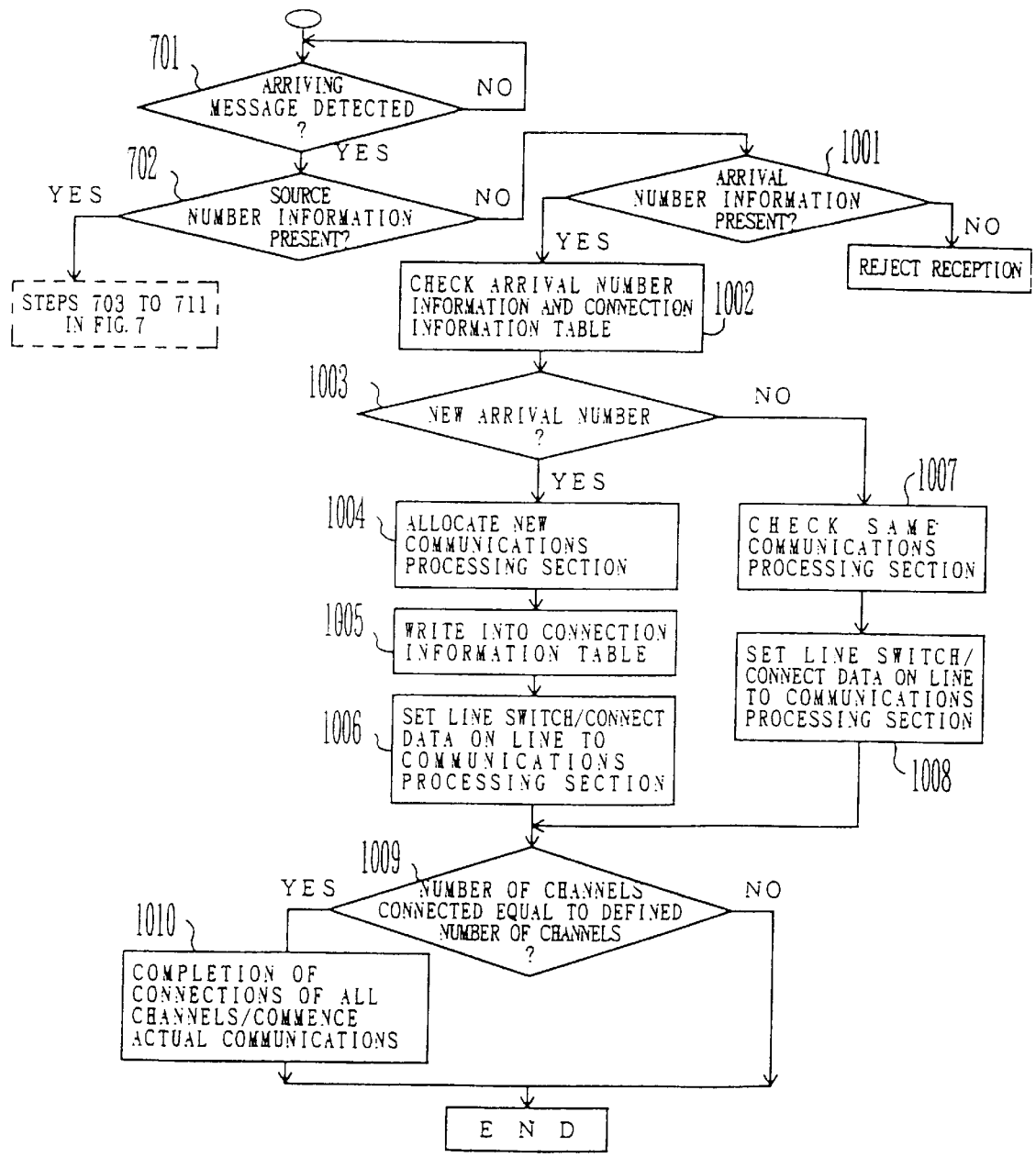
FIG. 10 is an operating flowchart showing the processing procedure of the overall controller in the second embodiment.
Figure 11:
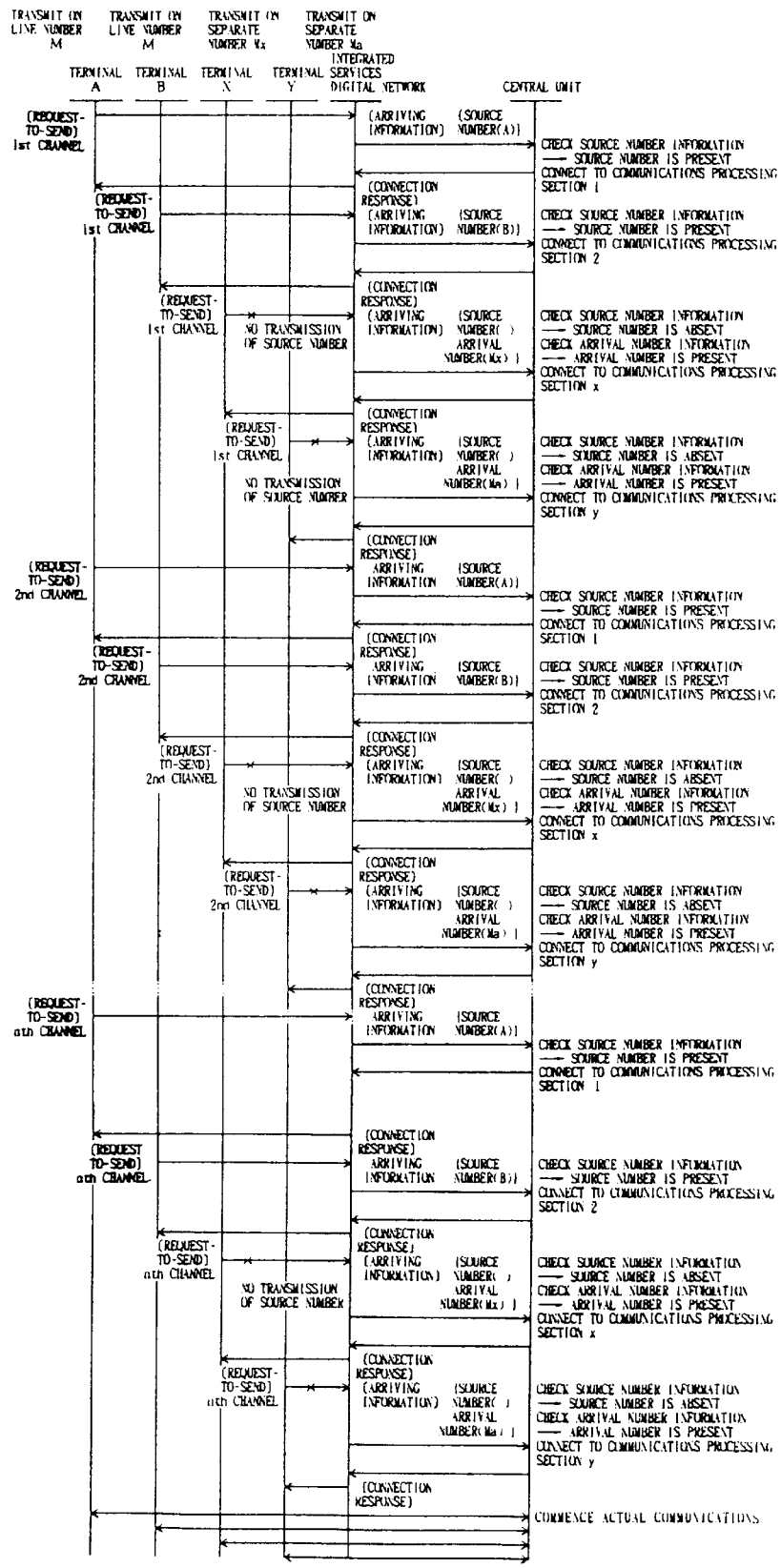
FIG. 11 shows the processing sequence in the second embodiment.

FIG. 9 shows a connection information table 307 used by the overall controller 304 in the second preferred embodiment. In comparison with the composition of the connection information table 307 of the first preferred embodiment shown in FIG. 4, the table shown in FIG. 9 contains arrival number information which is made to correspond with other information. The flow of control by the overall controller 304 in the second preferred embodiment is shown in FIG. 10. Also, the processing sequence of the second preferred embodiment is shown in FIG. 11.

When no source number information is present in an "arriving information" message shown in FIG. 6, the overall controller 304 analyzes arrival number information in that message. If arrival number information is present, then the controller performs the same processing as the processing associated with source number information by using the arrival number information in place of the source number information.

In the second embodiment, the system shown in FIG. 3 allocates a separate number to each of the communications terminals 308 (X, Y) in advance, on the understanding that their source number information is not transmitted to the central unit due to constraints on the network paths. As a result, as shown in FIG. 11, the communications terminal 308 (X) transmits using the separate number Mx, while the communications terminal 308 (Y) transmits using the separate number Ma. In contrast, the other normal communications terminals 308 transmit on the basic line number M.

In the operating flowchart shown in FIG. 10, whenever an arriving channel originates (YES in step 701), a determination is made as to whether source number information is present in the "arriving information" message shown in FIG. 6 (step 702).

If the source number information is present (YES in step 702), steps 703 to 711 shown in FIG.7 are carried out as with the first preferred embodiment.

If no source number information is present (NO in step 702), then a determination is further made as to whether arrival number information is present in that message (step 1001).

If no arrival number information is present (NO in step 1001), then the arriving channel is rejected.

If the arrival number information is present (YES in step 1001), then a search of the connection information table 307 is made to determine whether that arrival number information has been entered into the connection information table 307 shown in FIG. 9 (step 1002).

The control of arrival number information remains basically unchanged from the control of source number information in the first preferred embodiment (steps 704 to 711 in FIG. 7).

That is, when the arrival number information has not been entered into the connection information table 307 (YES in step 1003), a fresh communications processing section 306 is allocated (step 1004). If, on the other hand, the identical source number information has been entered into the connection information table 307 (NO in step 1003), the same processing section 306 is allocated (step 1007).

At each determination of allocation of a communications processing section 306, the overall controller 304 controls a line switch to connect a terminal communications channel specified by a communications channel number to that allocated communications processing section 306 (step 1006 or 1008).

In this manner, the 2nd to nth channels of each of the communications terminals 308 (X, Y) are connected to the corresponding communications processing section 306 (refer to FIG. 11). At the completion of connection of n channels to each communications terminal 308 (YES in step 1009), actual communication, of video, sound, data and/or the like commence (step 1010, refer to FIG. 11).

Third Preferred Embodiment

The system configuration of the third preferred embodiment is identical to that of the first preferred embodiment shown in FIGS. 3, 5 and 6 in the first preferred embodiment. If, when a communications terminal from which neither source number information nor arrival number information is transmitted makes a transmission, and no transmission is made simultaneously by any other communications terminal of such a type, the third embodiment allows the connection of that communications terminal, thereby increasing the reliability of communications.

FIG. 12 shows a connection information table 307 used by the overall controller 304 in the third preferred embodiment, which is identical in configuration to the table shown in FIG. 9 used in the second embodiment. The procedure of the overall controller 304 in the third preferred embodiment is shown in FIG. 13 and the processing sequence is shown in FIG. 14.

Figure 13:
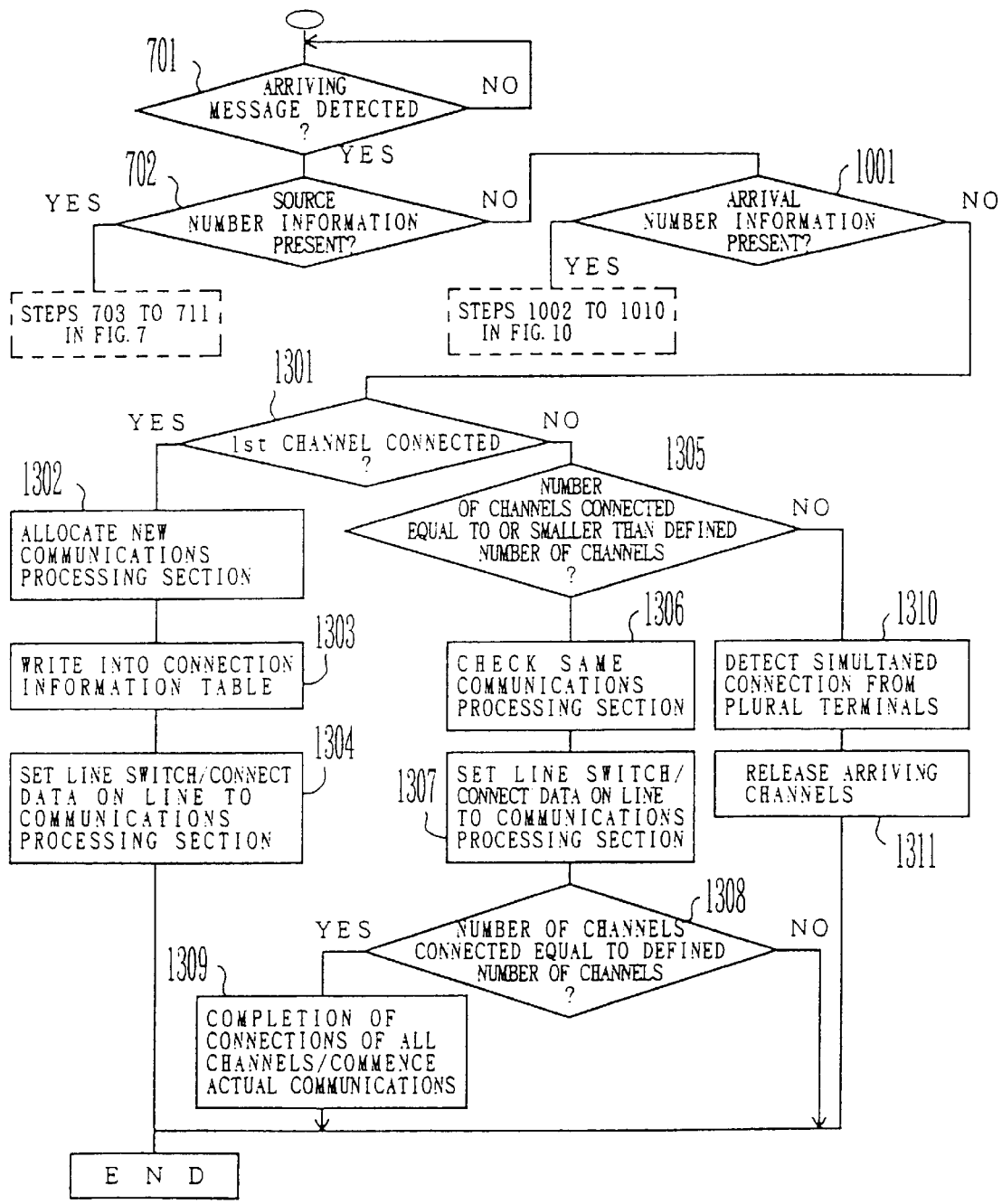
FIG. 13 is an operating flowchart showing the processing procedure of the overall controller in the third embodiment.

In the operating flowchart of FIG. 13, whenever an arriving channel originates (YES in step 701), a determination is first made as to the presence or absence of source number information in the "arriving information" message shown in FIG. 6 (step 702).

If the source number information is present (YES in step 702), then steps 703 to 711 of FIG. 7 are carried out as in the case of the first preferred embodiment.

If, on the other hand, no source number information is present (NO in step 702), then a further determination is made as to whether arrival number information is present or absent in the "arriving information" message shown in FIG.6 (step 1001).

If the arrival number information is present (YES in step 1001), then steps 1002 to 1010 of FIG. 10 are carried out as in the case of the second preferred embodiment.

If neither source number information nor arrival number information is present (NO in step 1001), then the arriving channels are considered as arriving channels from the same communications terminal 308 and then processed as such.

That is, in FIG. 13, a determination is first made as to whether an arriving channel (X) in which neither source number information nor arrival number information is present, is the first channel of such arriving channels (step 1301).

If the determination in step 1301 is YES, then a fresh communications processing section 306 (x) is allocated (step 1302, refer to FIG. 14).

If, on the other hand, the determination in step 1301 is N0, and the number of the arriving channels is a prescribed number or less, the same communications terminal 306 (X) is allocated (step 1306, refer to FIG. 14).

At each determination of allocation of a communications processing unit 306, the overall controller 304 controls the line switch to connect a terminal communications channel specified by a communications channel number to the allocated communications processing section 306 (step 1304 or 1308).

When the connection of n channels associated with the communications terminal 308 (x) is completed after repetition of such connection (YES in determination step 1308), actual communications of video, sound, data and/or the like start (step 1309, refer to FIG. 14).

When, on the other hand, the determination in step 1301 is NO and moreover the number of arriving channels exceeds the prescribed number (NO in step 1305), it is detected that arriving channels in which neither source number information nor arrival number information is present have been connected simultaneously from a number of communications terminals 308 (step 1310) and then a process of releasing the arriving channels is carried out (step 1311).

Fourth Preferred Embodiment

Figure 15:
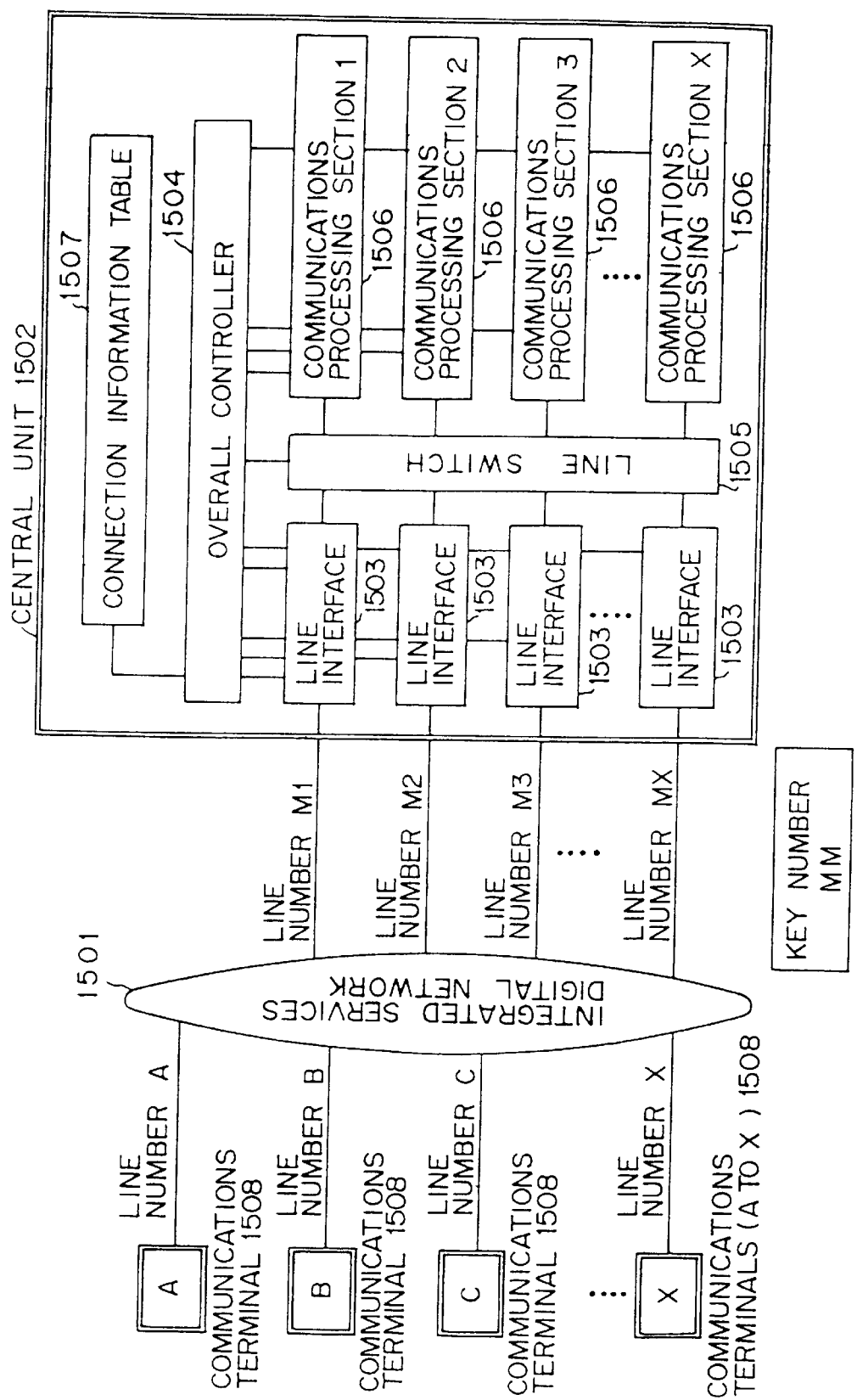
FIG. 15 shows an arrangement of the multipoint center system in the fourth to the seventh embodiments.

FIG. 15 shows a configuration of a multipoint central system according to a fourth preferred embodiment.

The system of FIG. 15 provides services such as multipoint television conferencing and the like by line connection of communications terminals 1508 (A to X) via an integrated services digital network 1501 to a multipoint central unit 1502 (hereinafter also referred to simply as a central unit).

Unlike the system shown in FIG. 3, a plurality of lines (line numbers M1 to MX) are used for the lines to the multipoint central unit 1502. In this case, a key number service of the network is utilized. This service is a service in which a key number MM is allocated to the plurality of lines and, when a communication terminal 1508 (A to X) transmits using the key number MM, a free channel is selected from among the lines of the network for reception. To allocate the line numbers M1 to MX to the communications terminals 1508 (A to X) by this service, each communications terminal simply transmits using the key number MM of the multipoint central unit 1502. As a result, actual communications of video, sound, data, and/or the like are made between each communications terminal 1508 and the multipoint central unit 1502 over a plurality of basic channels of the integrated services digital network 1501.

The number of basic channels used for communications is prescribed for each system.

Figure 16:
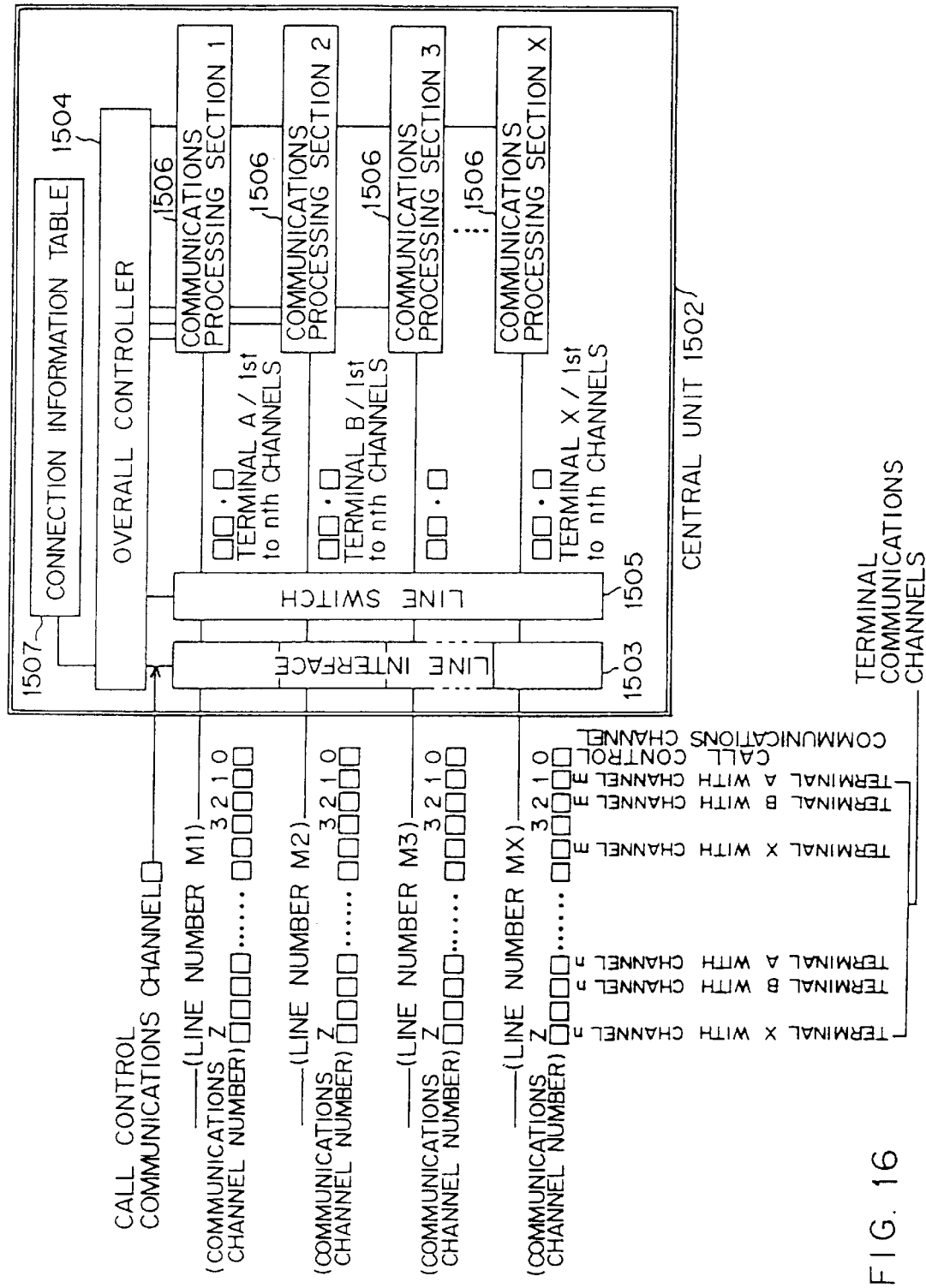
FIG. 16 shows an arrangement of communications channels on lines in the fourth embodiment.

FIG. 16 shows an arrangement of communications channels on the plural lines (line numbers M1 to Mx). The communications channels (the basic channels of the integrated services digital network) are respectively numbered 0 to Z. The communications channels can each be identified by their respective channel numbers.

The specific communications channel corresponding to the channel number 0 on each line is a call control communications channel, which is used for line connection between the multipoint central unit 1502 or the corresponding communication terminal 1508 (A to X) and the integrated services digital network 1501. All other communications channels are used for actual communications of video, sound, data, and/or the like between the central unit 1502 and the corresponding communications terminal 1508.

A line switching section 1505 in the central unit 1502 is instructed by an overall controller 1504 to separate the communications channels on any one of the lines shown in FIG. 15 into channels for each of the communications terminals 1508 (A to X) and to relay these channels to a corresponding one of communications processing sections 1506 (1 to x) which are provided to correspond to the respective communications terminals 1508. The fourth embodiment is distinct from the system shown in FIG. 3 in that any channels on the lines can be connected to the corresponding respective communications processing sections 1506 (1 to x). The line number and the positions of the terminal communications channels on each line used by each communications terminal 1508 are dependent on the order of line connections and hence vary every time.

Figure 18:
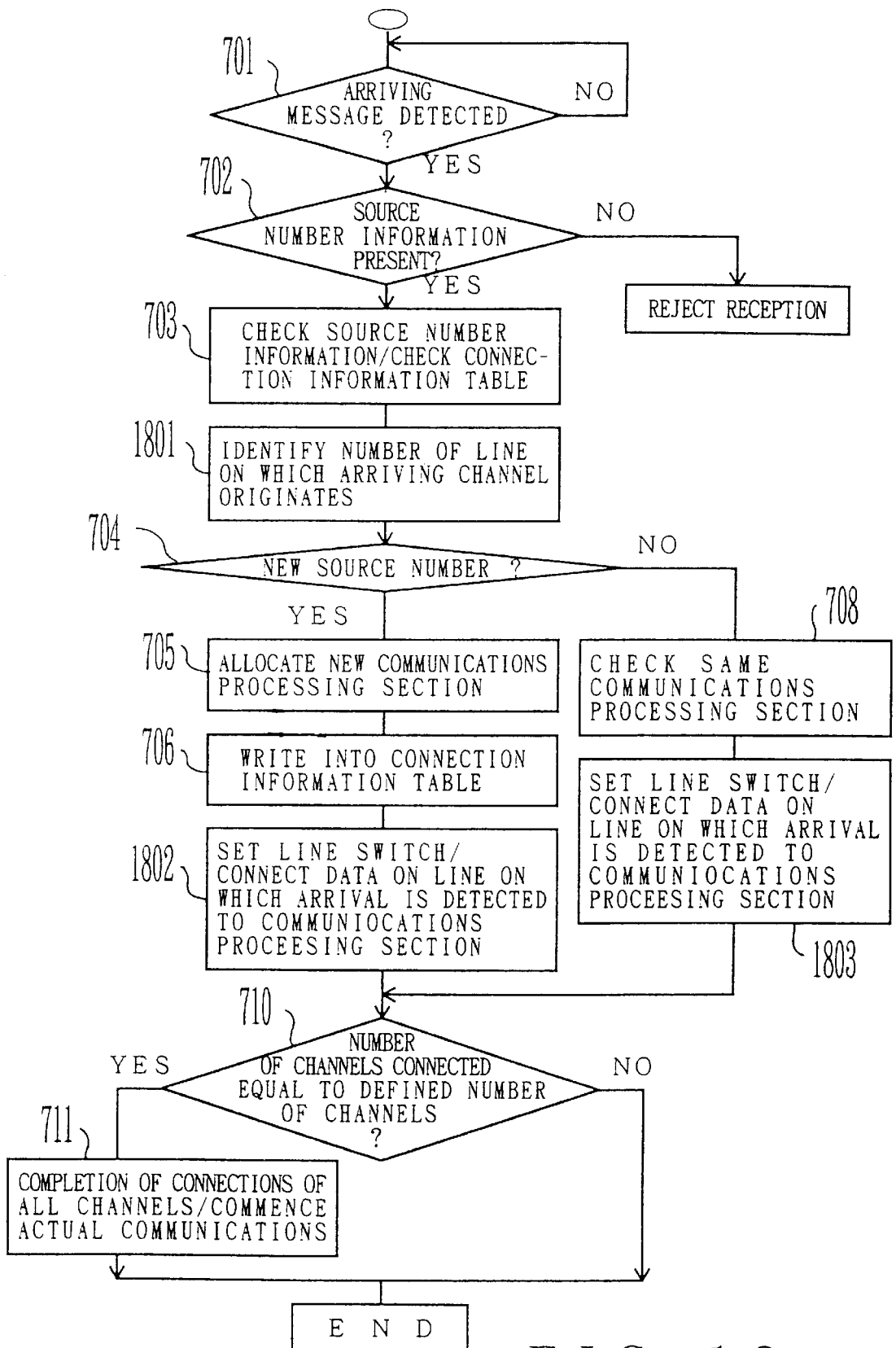
FIG. 18 is an operating flowchart showing the processing procedure of the overall controller in the fourth embodiment.

FIG. 17 shows a connection information table 1507 that the overall controller 1504 uses in the fourth preferred embodiment. In comparison with the connection information table 307 in the first preferred embodiment, in the table 1507, the line numbers are stored to correspond with other information. The procedure of the overall controller 1504 is shown in FIG. 18, and the processing sequence is shown in FIG. 19.

Figure 19:
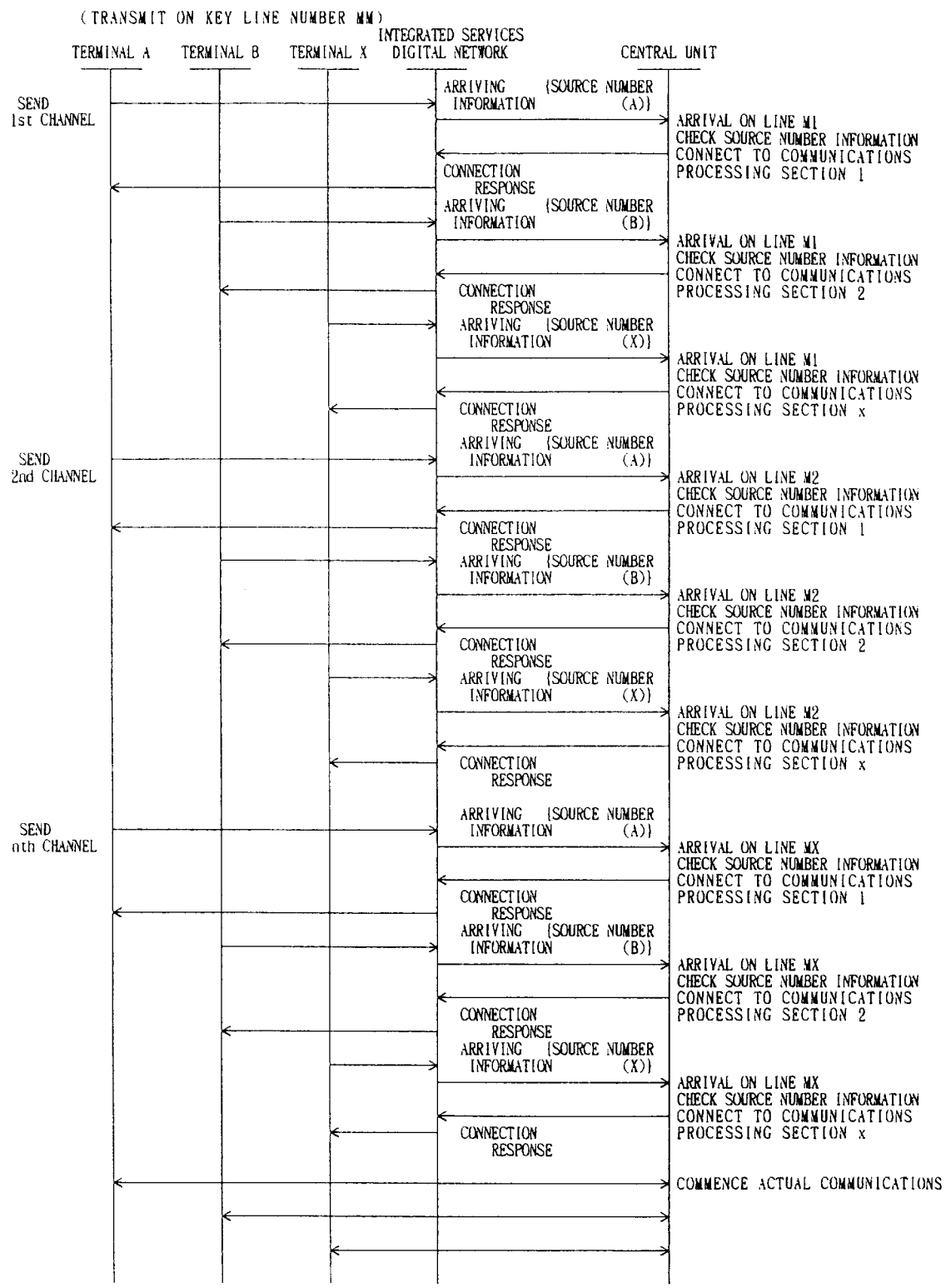
FIG. 19 shows the processing sequence in the fourth embodiment.

In FIG. 19, each of the communications terminals 1508 (A to X) transmit using the key number MM for their respective 1st to nth channels. The processing by the overall controller 1504, which remains basically unchanged from the processing (steps 701, 702, 703) of FIG. 7 carried out by the overall controller 304 in the first preferred embodiment, has newly added the functions of, after arriving channels have been detected, analyzing source number information and identifying the line number for which the arriving channels have been detected (step 1801) and connecting any terminal communications channels on any line which are specified by communications channel numbers to a predetermined one of the communications processing sections 1506 (1 to x) (steps 1802 and 1803) by controlling the line switching section 1505.

Even if the communications terminals 1508 (A to X) transmit simultaneously their respective 1st to nth channels at any time, the above-described functions permit all the communications channels associated with each communications terminal to be properly connected to a corresponding communications processing section 1506 (1 to x). At the completion of the connection of n channels for each communications terminal 1508 (YES in step 710 in FIG. 18), actual communications of video, sound, data, and/or the like commence (step 711 in FIG. 18, refer to FIG. 19).

Fifth Preferred Embodiment

In a fifth embodiment of the invention, the line switching section 1505 is omitted from the system configuration of the fourth embodiment shown in FIG. 15, so that each of the line interfaces 1503 is fixedly connected to a corresponding one of the communications processing sections 1506 (1 to x).

Figure 20:
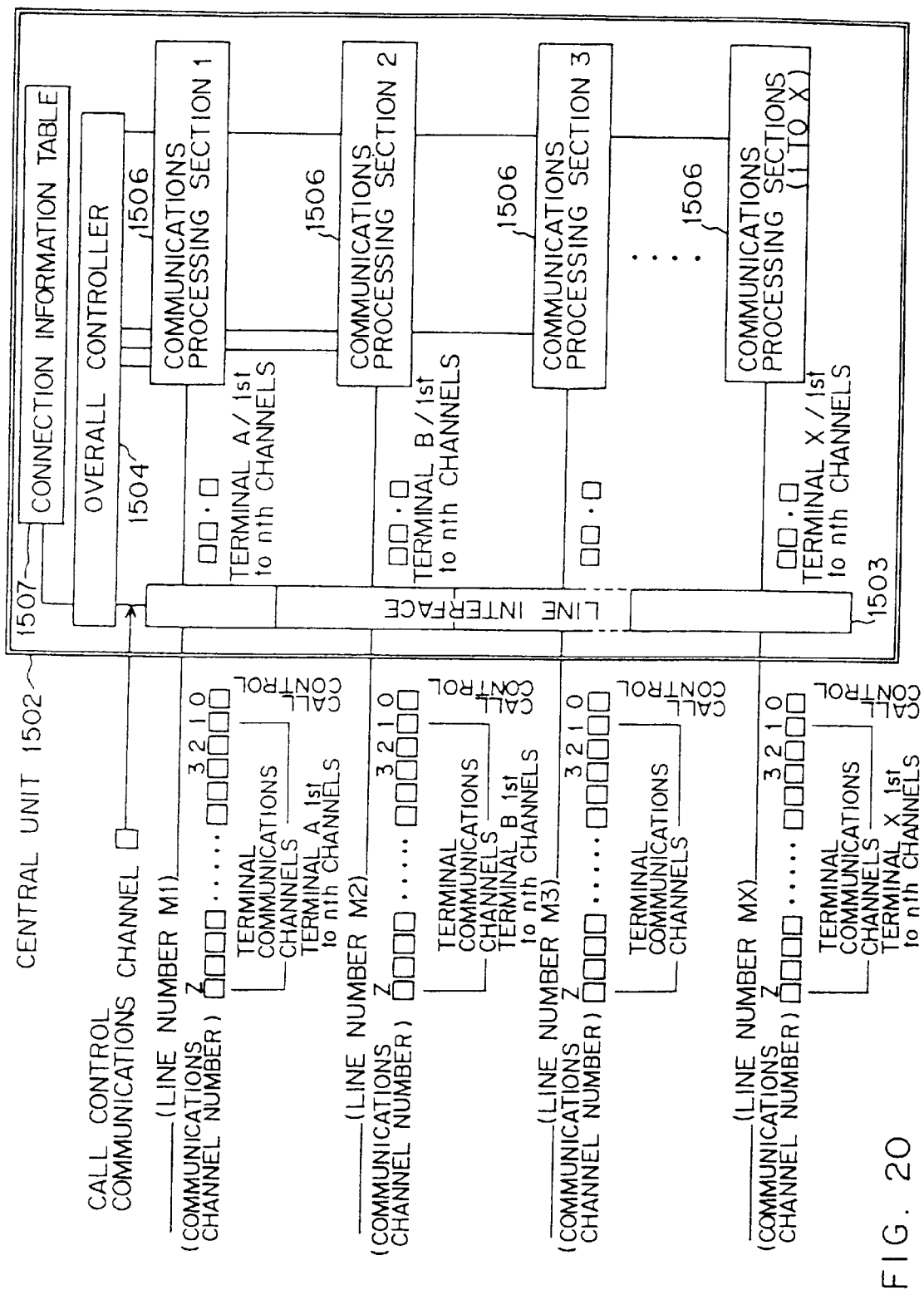
FIG. 20 shows an arrangement of communications channels on lines in the fifth to the seventh embodiments.

FIG. 20 shows an arrangement of communications channels on each of the lines (line numbers M1 to MX) in the fifth preferred embodiment.

In the arrangement of FIG. 20, unlike the arrangement of FIG. 16 in the fourth preferred embodiment, the communications terminals 1508 (A to X) are respectively allocated line numbers M1 to MX in advance. Each of the communications terminals 1508 (A to X) transmits using the line number M1 to MX allocated to it. Based on the precondition that arriving channels originating on each line are from the same communications terminal, the multipoint central unit 1502 connects arriving channels on each line to the communications processing section 1506 (1 to x) corresponding to that line.

Figure 21:
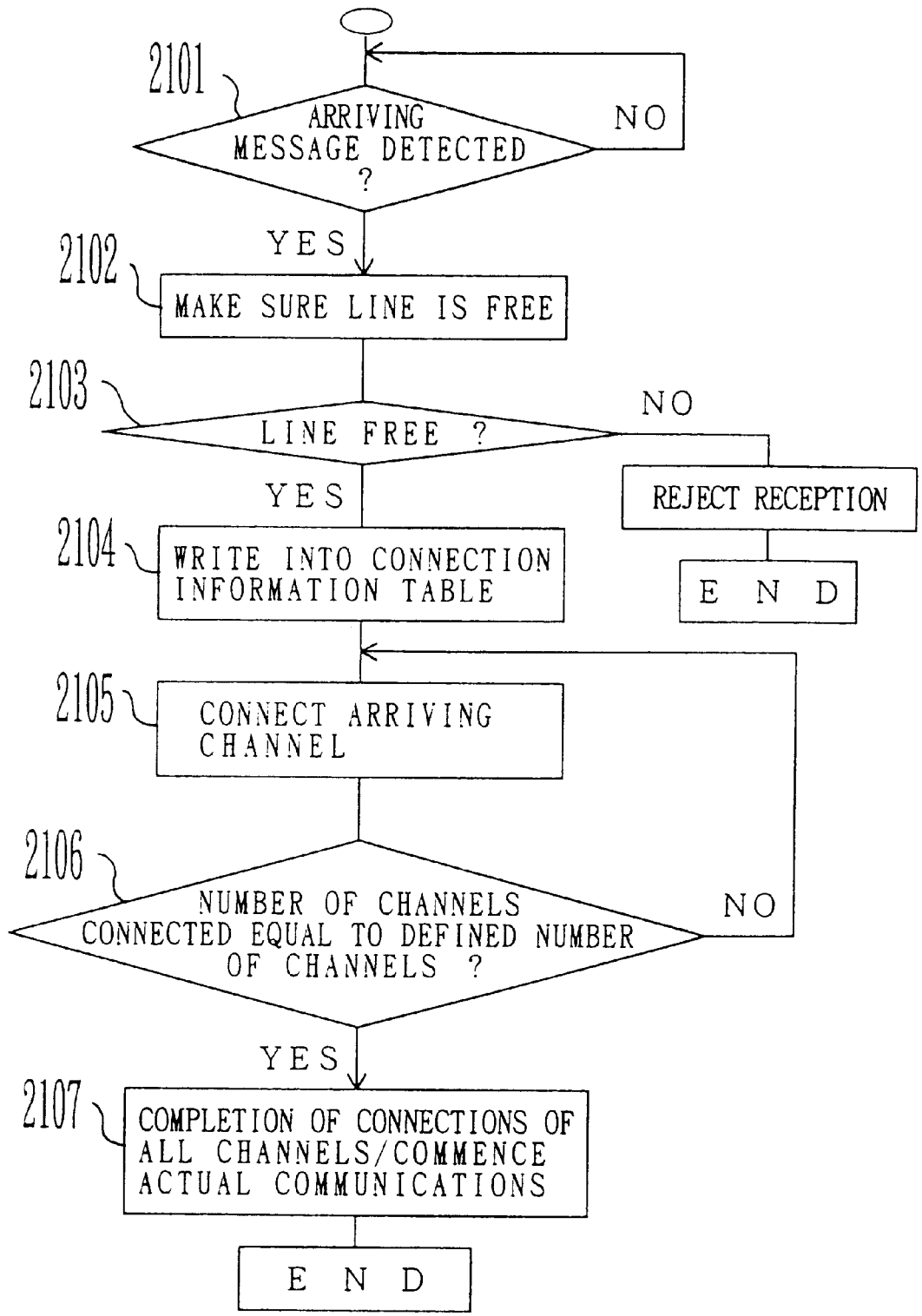
FIG. 21 is the first operating flowchart showing the processing procedure of the overall controller in the fifth embodiment.
Figure 23:
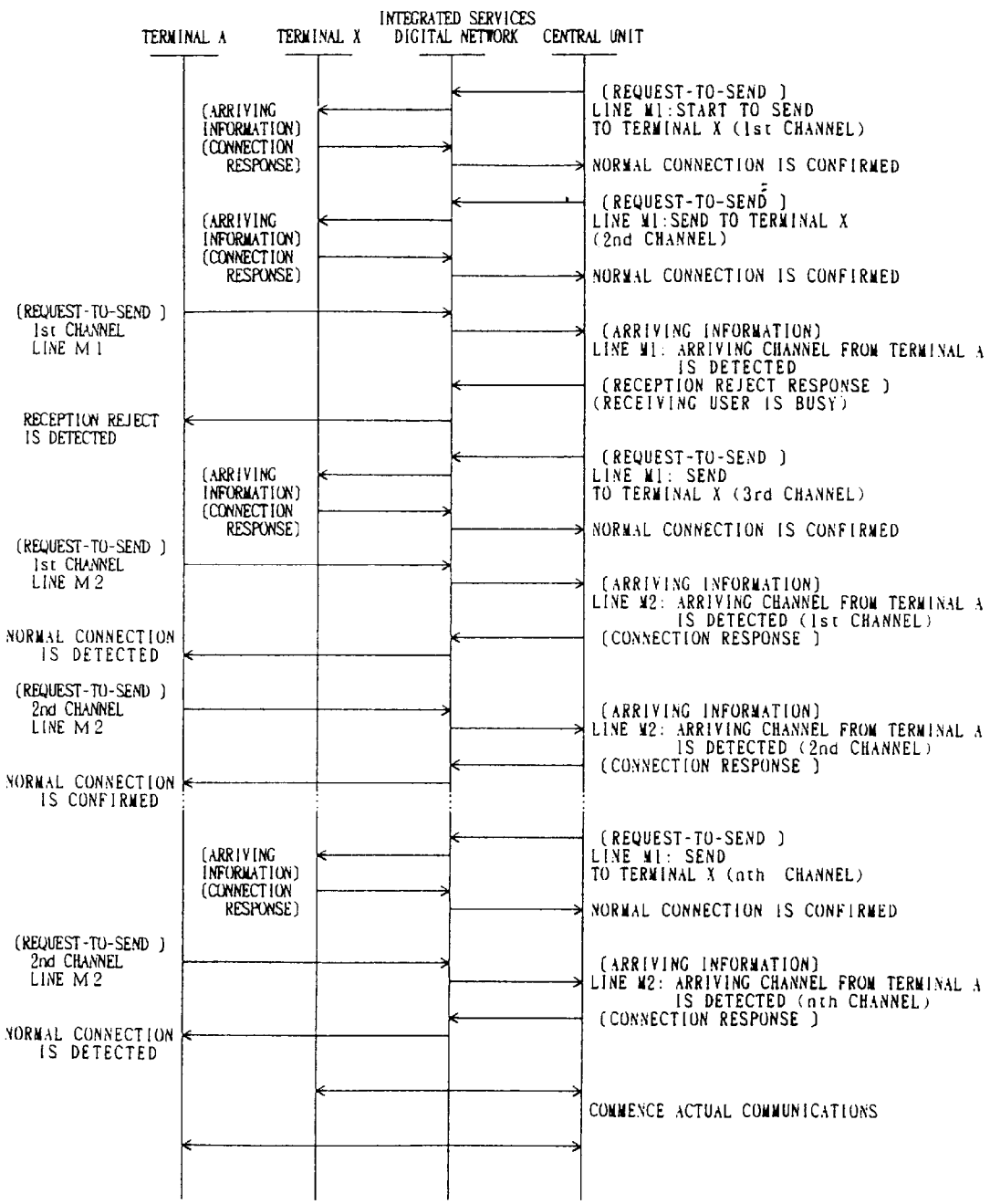
FIG. 23 shows the processing sequence in the fifth embodiment.

FIG. 21 shows the procedure of the overall controller 1504 to implement the above functions in the fifth embodiment. FIG. 23 shows the processing sequence corresponding to the procedure shown in FIG. 21.

In FIG. 21, when detecting the arrival of a communications channel from a communications terminal 1508 (step 2101), the overall controller 1504 checks the connection information table 1507, which is the same as that in the first preferred embodiment shown in FIG. 4, to make sure that the corresponding line is free (step 2102).

If that line is free, then the overall controller 1504 writes source number information and the communications channel number on the line (refer to FIG. 4) into the connection information table 1507 (step 2104) and then connects that communications channel to the corresponding communications processing section 1506 by informing that communications processing section of the channel information (step 2105). Such a connection process is repeated until the number of connections of communications channels for that communications terminal becomes equal to the number of the channels defined by the system (step 2106).

On the completion of the connection of all the communications channels for that communications terminal (YES in step 2106), actual communications of video, sound, data, and/or the like commence (step 2107).

For example, in FIG. 23, the central unit 1502 commences a process of connecting the 1st to nth channels for the communications terminal 1508 (X) using the line numbered M1.

On the other hand, the communications terminal 1508 (A) makes a transmission on the line number M1. The central unit 1502 returns a reception reject response to the communications terminal 1508 (A) in response to that transmission because it is in the process of connecting the arriving channels from the communications terminal (X) using the line numbered M1. Note here that each communications terminal 1508 knows the numbers M1 to MX of all the lines of the multipoint central unit 1502 and has a function of attempting to make transmissions on other line numbers one after another when it receives a reception reject response after it has attempted to transmit on the line number allocated to itself. Thus, the communications terminal 1508 (A) makes an attempt to transmit an the line number M2 other than M1. Since the line corresponding to the line number M2 is free, the central unit 1502 properly connects it to the corresponding communications processing unit.

Aside from the above operation, the fifth embodiment also permits the multipoint central unit 1502 to make a transmission to specific communications terminals 1508.

Figure 22:
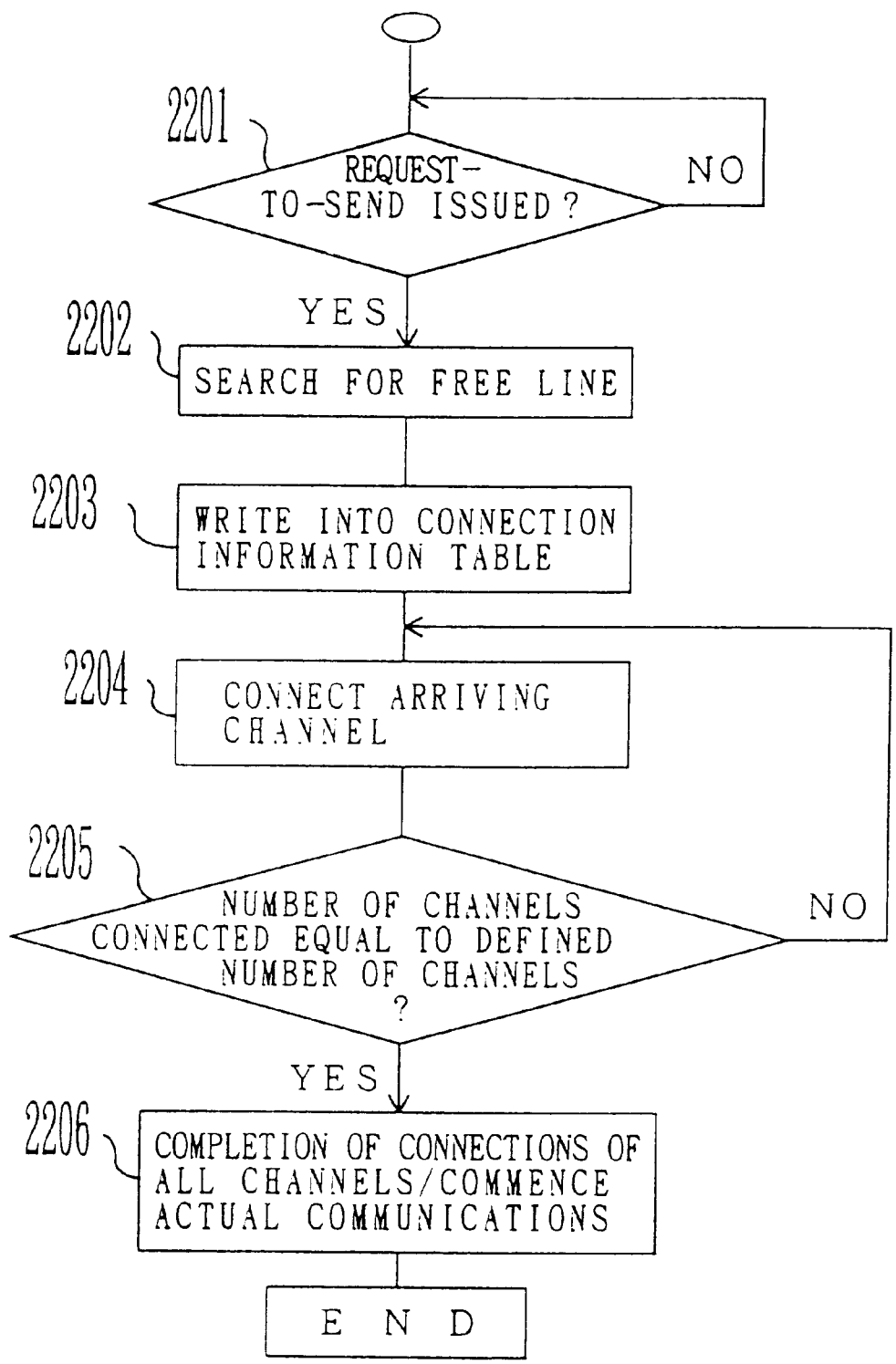
FIG. 22 is the second operating flowchart showing the processing procedure of the overall controller in the fifth embodiment.

The procedure of the overall controller 1504 for implementing such a function is illustrated in FIG. 22.

In FIG. 22, when a request arises to make transmission to a specific communications terminal 1508 (YES in step 2201), the overall controller 1504 in the multipoint central unit 1502 first searches for a free line (step 2202).

Next, the overall controller 1504 writes into the connection information table 1507 the source number to which transmission is to be made and the number of a communications channel (refer to FIG. 4) on the free line searched for on which it is to be transmitted (step 2203) and then connects the communications channels to the corresponding communications processing section by informing that communications processing section 1506 of the channel information (step 2204). Such a connection process is repeated until the number of connections of communications channels for that communications terminal reaches the number of channels defined by the system (step 2205).

On the completion of the connection of all the communications channels for that communications terminal 1508 (YES in step 2205), actual communications of video, sound, data, and/or the like commence (step 2206).

In this case, when arriving channels from another communications terminal 1508 originate on the line over which the above transmission is being made by the central unit, a reception reject response is returned to that communications terminal by the overall controller 1504 because the determination in step 2103 of FIG. 21 is NO.

Sixth Preferred Embodiment

As with the fifth preferred embodiment, in a sixth preferred embodiment of the invention, the line switching section 1505 is omitted from the system configuration of FIG. 15.

In the fifth preferred embodiment, if, when each communications terminal 1508 transmits on the line number allocated to it, the channels on the line are in the process of being connected, then the central unit 1502 returns a reception reject response to that communications terminal 1508 and the communications terminal 1508 attempts to transmit on other line numbers one after another. In contrast, in the sixth preferred embodiment, if, when each communications terminal 1508 transmits on the line number allocated to it, the channels on the line are in the process of being connected, then the central unit searches for a free line and issues to the integrated services digital network 1501 a "request to transfer arriving message" to the free line searched for. In response to this, the integrated services digital network 1501 transfers transmissions from that communications terminal 1508 to the free line.

Figure 24:
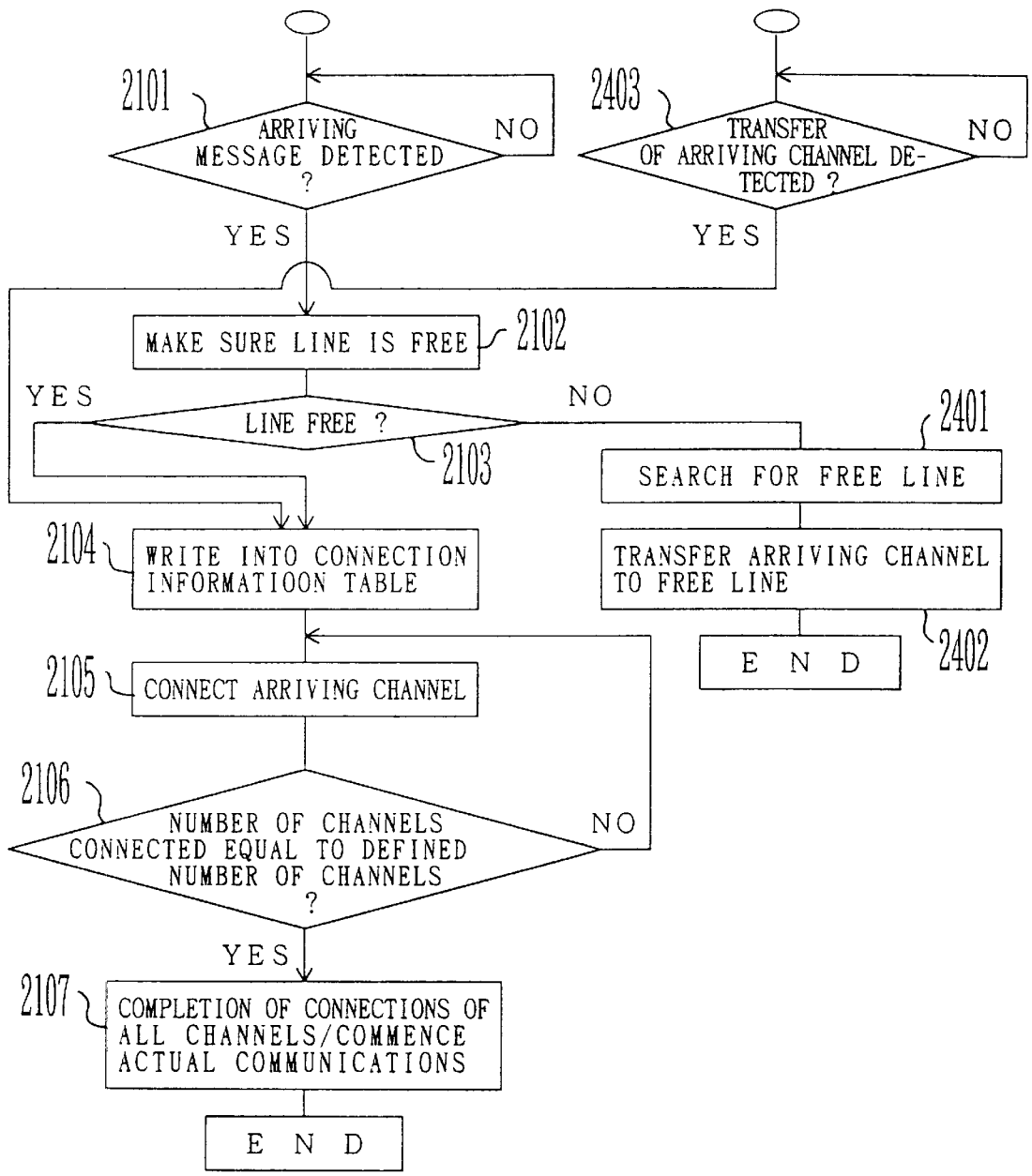
FIG. 24 is an operating flowchart showing the processing procedure of the overall controller in the sixth embodiment.
Figure 25:
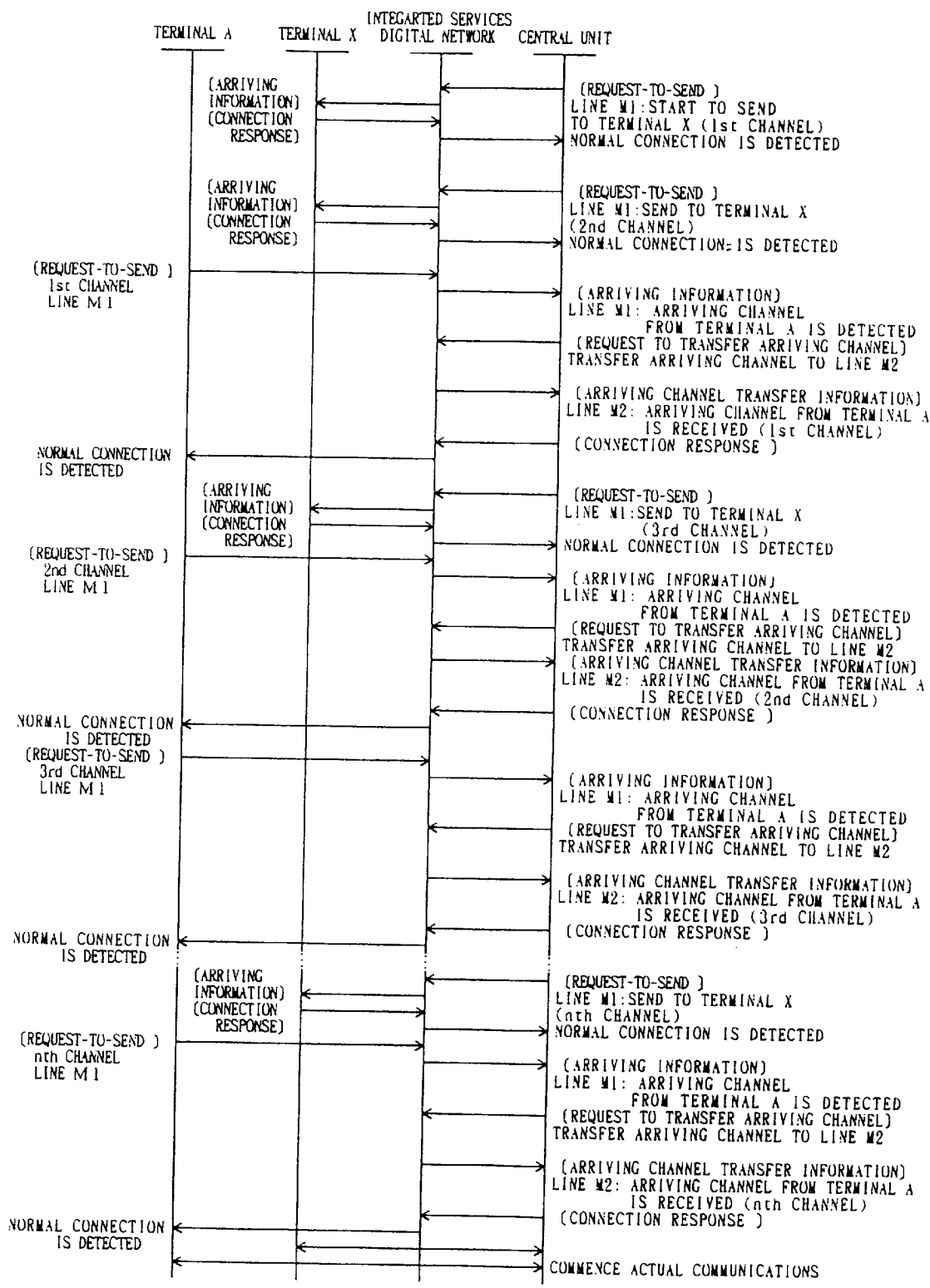
FIG. 25 shows the processing sequence in the sixth embodiment.

The procedure of the overall controller 1504 to implement such a function is shown in FIG. 24, and the processing sequence of Sixth Preferred Embodiment corresponding to the procedure is shown in FIG. 25.

In FIG. 24, when detecting an arriving channel from a communications terminal 1508 (step 2101), the overall controller 1504 checks the connection information table 1507, which is the same as that in the first preferred embodiment shown in FIG. 4, to make sure that the corresponding line is free (step 2102).

If that line is free, then the overall controller 1504 performs the same operations as those in steps 2104 to 2107 of FIG. 21 in the fifth embodiment to connect communication channels using the line.

If, on the other hand, the line is not free, the overall controller 1504 searches the connection information table 1507 for another free line (step 2401).

The overall controller 1504 then sends a "request to transfer arriving message" type message (refer to FIG. 6) that contains the line number of the searched free line as arrival number information (the number of the line to which the arriving message is forwarded) to the integrated services digital network 1501 (step 2402).

Upon receipt of the "request to transfer arriving message" message, the digital network 1501 returns to the central unit 1502 a "arriving channel transfer information" message (refer to FIG. 6) that contains the number of the line to which the arriving message is forwarded which is contained in the received message as arrival number information and the source number of the original communications terminal 1508 that has made the transmission.

Upon detecting the "arriving channel transfer information" message (step 2403), the overall controller 1504 in the central unit 1502 performs the same operations as those in steps 2104 to 2107 of FIG. 21 in the fifth preferred embodiment, thereby allowing the line corresponding to the arrival number information contained in that message to carry out the arriving process.

For example, in FIG. 25, the central unit 1502 commences a process of connecting the 1st to nth channels for the communications terminal 1508 (X) by the use of the line numbered M1. Even if the communications terminal 1508 (A) attempts to transmit on the line number M1 while channels on the line numbered M1 are being connected, the overall controller 1504 in the central unit 1502 issues to the integrated services digital network 1501 a request to transfer an arriving channel from communication terminal 1508 (A) to the line numbered M2. As a result, an "arriving channel transfer information" message that directs the transfer of the arriving channel to the line (M2) is sent from the integrated services digital network 1501 to the central unit 1502. Thus, the 1st to Mth channels from the communications terminal 1508 (A) are connected to the line (M2) in sequence. After all the channels have been connected, actual communications of video, sound, data, and/or the like commence.

In the manner described above, the sixth preferred embodiment permits arriving channels on a line to be transferred to another line quickly, even if, the same as in the fifth preferred embodiment, each communications terminal 1508 does not have a function of retransmission to a line other than the line allocated to itself.

As with the fifth preferred embodiment, in the sixth preferred embodiment, the central unit 1502 may also have a function of transmitting to specific communications terminals 1508.

Seventh Preferred Embodiment

As with the sixth preferred embodiment, in a seventh preferred embodiment, the transfer of arriving channels is made. In addition, if, when a process of transferring arriving channels to a line is performed by the central unit 1502, an arriving channel from a communications terminal 1508 to that line which has been originally allocated to that terminal is detected, the arriving channel is transferred to still another line.

Figure 26:
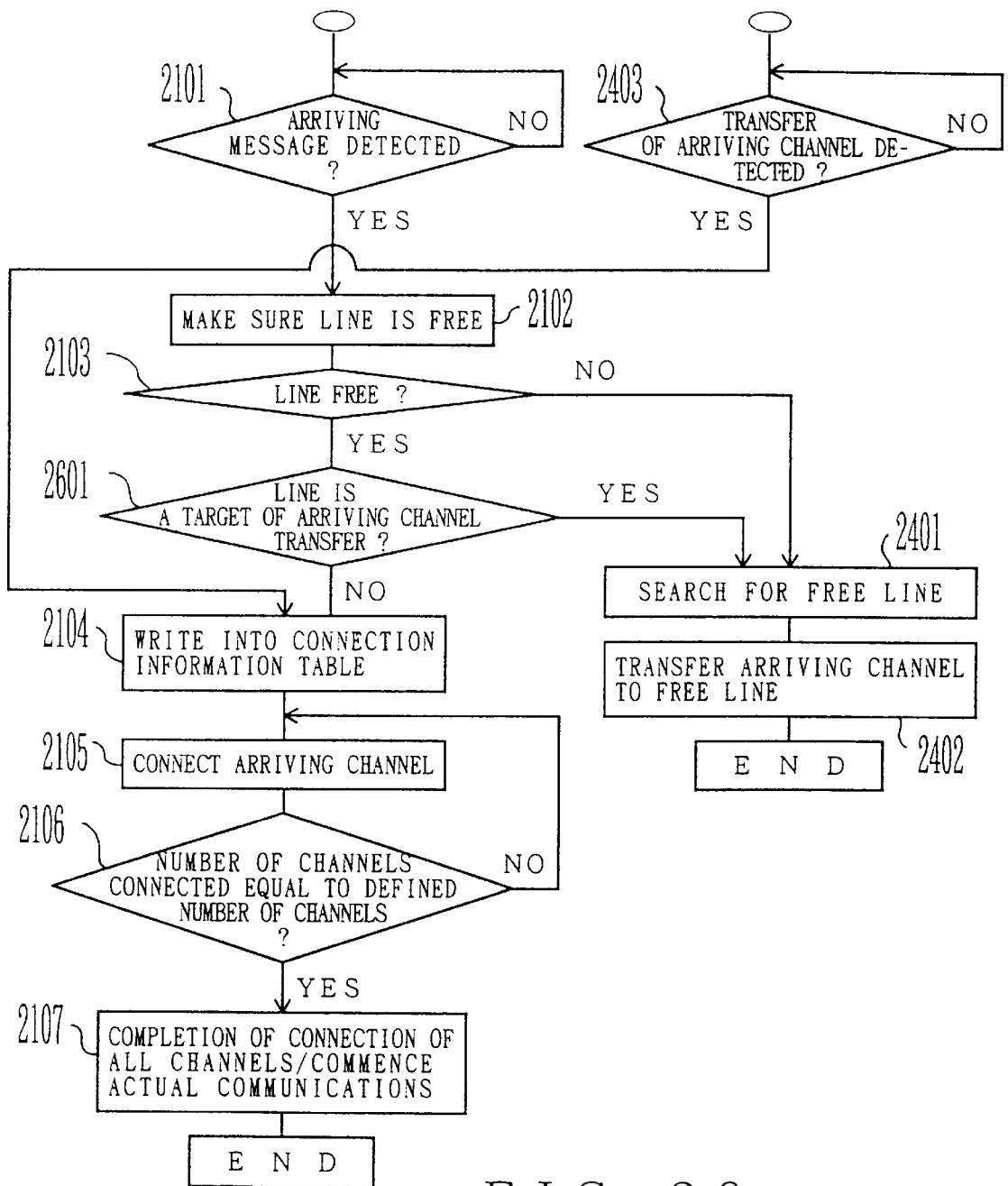
FIG. 26 is an operating flowchart showing the processing procedure of the overall controller in the seventh embodiment.
Figure 27:
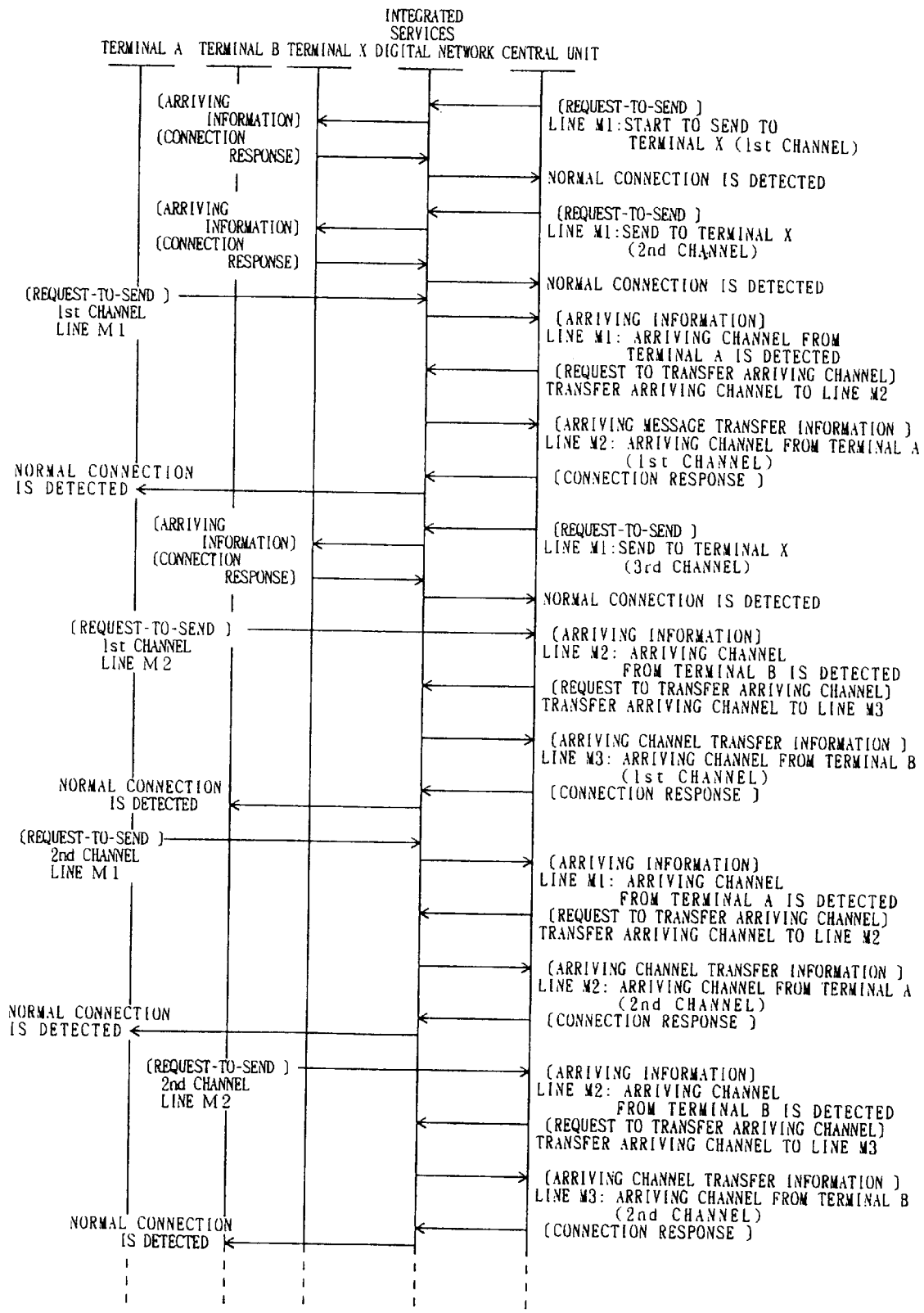
FIG. 27 shows the processing sequence in the seventh embodiment.
Figure 28:
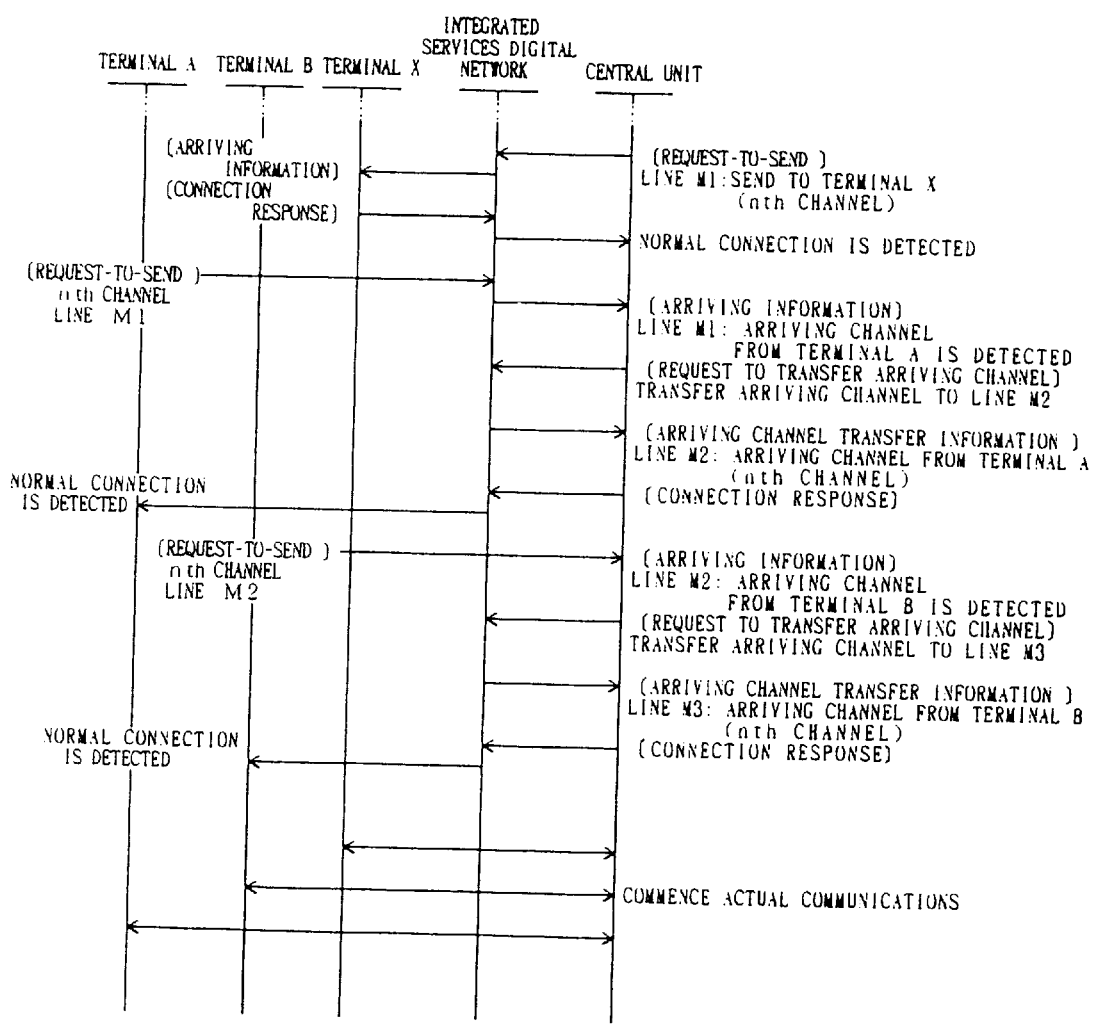
FIG. 28 shows the processing sequence in the seventh embodiment.

The procedure of the overall controller 1504 to implement such a function is shown in FIG. 26, and the processing sequence corresponding to the procedure is shown in FIGS. 27 and 28.

In FIG. 26, blocks which correspond in function to blocks in FIGS. 21 or 24 are denoted by the same reference numerals.

In FIG. 26, when detecting an arriving communications channel from a communications terminal and determining that the corresponding line is free (steps 2101 to 2103), the overall controller 1504 makes a determination as to whether or not that line is in the transfer process based on an "arriving channel transfer" message (step 2601).

If the determination is NO, then the overall controller 1504 carries out steps 2104 to 2107 which are the same as the corresponding steps shown in FIG. 21 in the fifth preferred embodiment, thereby connecting the communications channel.

If, on the other hand, the determination in step 2601 is YES, then the overall controller 1504 carries out steps 2401 and 2402 which are the same as the corresponding steps shown in FIG. 24 in the sixth preferred embodiment, thereby sending to the integrated services digital network 1501 a "request to transfer arriving channel" message shown in FIG. 6 that contains the number of a free line as arrival number information (the number of a line to which arriving channels are to be forwarded). Upon receipt of that message, the integrated services digital network 1501 returns to the central unit 1502 an "arriving channel transfer information"

message shown in FIG. 6 that contains the number of a line to which arriving channels are to be forwarded as arrival number information and the source number information of the communications terminal 1508 from which that communications channel has originated. Upon detecting the "arriving channel transfer information" message (step 2403), the overall controller 1504 in the central unit 1502 carries out steps 2104 to 2107 of FIG. 21, thereby forwarding the arriving channel to the line corresponding to the arrival number contained in that message.

For example, in FIGS. 27 and 28, the central unit 1502 commences a process of connecting the 1st to nth channels for the communications terminal 1508 (X) by the use of the line numbered M1. If the communications terminal 1508 (A) attempts to transmit on the line number M1 while channels on the line numbered M1 are being connected, the overall controller 1504 in the central unit 1502 issues to the integrated services digital network 1501 a request to forward an arriving channel from that communication terminal 1508 (A) to the line numbered M2. As a result, an "arriving channel transfer information" message that directs the transfer of the arriving channel to the line (M2) is sent from the integrated services digital network 1501 to the central unit 1502. Thus, a process of connecting the 1st to nth channels from the communications terminal 1508 (A) is performed in sequence using the line (M2). Further at this point, if the communications terminal 1508 (B) attempts to transmit on the line number M2 while channels on the line numbered M2 are in the process of arriving, the overall controller 1504 issues to the integrated services digital network 1501 a request to forward an arriving channel from that communication terminal (B) to the line numbered M3. As a result, an "arriving channel transfer information" message that directs the transfer of the arriving channel to the line (M3) is sent from the integrated services digital network 1501 to the central unit 1502. Thus, a process of connecting the 1st to nth channels from the communications terminal 1508 (B) is performed in sequence using the line numbered M3. After all the channels have been connected, actual communications of video, sound, data, and/or the like commence.

In the manner described above, the seventh preferred embodiment detects that, when arriving channels from a communications terminal are being transferred to a line, arriving channels from another communications terminal originate on that line, and forwards the arriving channels from another communications terminal to another line, thus permitting highly reliable communications to be achieved.

As with the fifth preferred embodiment, in the seventh preferred embodiment, the central unit 1502 may also have a function of making transmissions to a specific communications terminal 1508.

What is claimed is:

1. A multipoint multichannel connection device for line-connecting communications terminals at multiple points to a central unit using a plurality of channels through an integrated services digital network having a function of allocating a main number and separate numbers for one line connected to said central unit and informing said central unit of a separate number of a line specified by a source communications terminal at the time of transmission as arrival number information and a function of selectively informing said central unit of the number of a source communications terminal as source number information, comprising:

source number information identifying means, included in said central unit, for identifying source number information provided by said integrated services digital network; and communications processing means, included in said central unit, for processing a plurality of arriving channels, each arriving channel having source number information that is identical for arriving channels originating from the same communications terminal, and processing arriving channels whose number is a predetermined number or less for which source number is not identified as arriving channels from the same communications terminal.

2. A multipoint, multichannel connection device for line-connecting communications terminals at multiple points and a central unit using a plurality of channels through an integrated services digital network having a function of allocating a main number and separate numbers for one line connected to said central unit and informing said central unit of a separate number of a line specified by a source communications terminal at the tine of transmission as arrival number information and a function of selectively informing said central unit of the number of a source communications terminal as source number information, each of said communications terminals making a transmission to said central unit using one of said separate numbers allocated, comprising:

arrival number information identifying means, included in said central unit, for identifying arrival number information provided by said integrated services digital network; and communications processing means, included in said central unit, for processing a plurality of arriving channels, each arriving channel having arrival number information that is identical for arriving channels originating from the same communications terminal, and processing arriving channels whose number is a predetermined number or less for which source number is not identified as arriving channels from the same communications terminal.

3. A multipoint, multichannel connection device for line-connecting communications terminals at multiple points and a central unit using a plurality of channels through an integrated services digital network having a function of allocating a main number and separate numbers for one line connected to said central unit and informing said central unit of a separate number of a line specified by a source communications terminal at the time of transmission as arrival number information and a function of selectively informing said central unit of the number of a source communications terminal as source number information, comprising:

source number information identifying means, included in said central unit for identifying source number information provided by said integrated services digital network;

arrival number information identifying means, included in said central unit, for identifying arrival number information provided by said integrated services digital network; and communications processing means, included in said central unit, for processing a plurality of arriving channels, each arriving channel having source number information by said source number identifying means that is identical for arriving channels originating from the same communications terminal, processing a plurality of arriving channels, each arriving channel having arrival number information by said identifying means that is identical for arriving channels originating from the same communications terminal, and processing arriving channels whose number is a predetermined number or less and for which neither source number information nor arrival number information that is identical for arriving channels from the same communications terminal.

4. A multipoint, mulitchannel connection device for line-connecting communications terminals at multiple points and a central unit using a plurality of channels through an integrated services digital network having a function of allocating a main number and separate numbers for one line connected to said central unit and informing said central unit of a separate number of a line specified by a source communications terminal at the time of transmission as arrival number information and a function of selectively informing said central unit of the number of a source communications terminal as source number information, comprising:

a plurality of lines connecting said central unit and said digital network, a key number being set up on said plurality of lines;

source number information identifying means, included in said central unit, for identifying source number information sent over any of said lines connected to said digital network; and communications processing means, included in said central unit, for processing a plurality of arriving channels on any of said lines, each arriving channel having source number information that is identical for arriving channels originating from the same communications terminal, and processing arriving channels whose number is a predetermined number or less for which source number is not identified as arriving channels from the same communications terminal.

5. A multipoint, multichannel connection device for line-connecting communications terminals at multiple points and a central unit using a plurality of channels through an integrated services digital network having a function of allocating a main number and separate numbers for one line connected to said central unit and informing said central unit of a separate number of a line specified by a source communications terminal at the time of transmission as arrival number information and a function of selectively informing said central unit of the number of a source communications terminal as source number information, wherein said central unit and said digital network are connected by a plurality of lines each of which is allocated a different number, and each of said communications terminals makes a transmission to said central unit on a preallocated line number and, when said transmission is rejected, makes transmission using another line number, and comprising communications processing means, included in said central unit, for processing a plurality of arriving channels using a line as arriving channels from the same communications terminal.

6. The device according to claim 5, wherein said central unit further includes transmission control means for searching for a free line and making transmission to a specific communications terminal over said free line to thereby cause said communications processing means to process the transmission of a plurality of channels over said free line as transmission to said specific communications terminal.

7. A multipoint, multichannel connection device for line-connecting communications terminals at multiple points and a central unit using a plurality of channels through an integrated services digital network having a function of forwarding arriving channels, a function of allocating a main number and separate numbers for one line connected to said central unit and informing said central unit of a separate number of a line specified by a source communications terminal at the time of transmission as arrival number information and a function of selectively informing said central unit of the number of a source communications terminal as source number information, wherein said central unit and said digital network are connected by a plurality of lines each of which is allocated a different number, and each of said communications terminals makes a transmission to said central unit on a preallocated line number, and comprising communications processing means, included in said central unit, for processing a plurality of arriving channels on a line as arriving channels from the same communications terminal, and arriving channel forwarding control means, included in said central unit, for searching for a free line for an arriving channel to a line that is processing or busy, issuing to said digital network a request to forward said arriving channel to a line that is processing or busy to said free line, and forwarding said arriving channel to a line that is processing or busy to said free line on the basis of arriving channel forwarding information sent by said digital network in response to said request.

8. The device according to claim 7, wherein, when a second arriving channel originates on said free line during a process of forwarding said arriving channel to a line that is in process or busy to said free line, said arriving channel forwarding control means searches for a second free line, issuing to said digital network a request to forward said second arriving channel to said second free line, and forwarding said arriving channel to said second free line on the basis of second arriving channel forwarding information sent by said digital network in response to said second request.

9. The device according to claim 7, wherein said central unit further includes transmission control means for searching for a free line and making a transmission to a specific communications terminal over said free line to thereby cause said communications processing means to process the transmission of a plurality of channels over said free line as transmission to said specific communications terminal.

* * * * *